(12) United States Patent
Ojha et al.

(10) Patent No.: US 12,511,282 B1
(45) Date of Patent: Dec. 30, 2025

(54) GENERATING STRUCTURED QUERY LANGUAGE USING MACHINE LEARNING

(71) Applicant: MicroStrategy Incorporated, Vienna, VA (US)

(72) Inventors: Ananya Ojha, Dunn Loring, VA (US); William Hurwood, Washington, DC (US)

(73) Assignee: MicroStrategy Incorporated, Vienna, VA (US)

( * ) Notice: Subject to any disclaimer, the term of this patent is extended or adjusted under 35 U.S.C. 154(b) by 0 days.

(21) Appl. No.: 18/653,504

(22) Filed: May 2, 2024

Related U.S. Application Data

(60) Provisional application No. 63/463,421, filed on May 2, 2023, provisional application No. 63/463,511, filed on May 2, 2023.

(51) Int. Cl.
   *G06F 16/2452* (2019.01)
   *G06F 16/242* (2019.01)
   *G06F 16/248* (2019.01)

(52) U.S. Cl.
   CPC .... *G06F 16/24522* (2019.01); *G06F 16/2423* (2019.01); *G06F 16/248* (2019.01)

(58) Field of Classification Search
   None
   See application file for complete search history.

(56) References Cited

U.S. PATENT DOCUMENTS

| | | | |
|---|---|---|---|
| 8,892,534 | B2 | 11/2014 | Hamlescher et al. |
| 9,369,410 | B2 | 6/2016 | Capper et al. |
| 10,025,819 | B2 | 7/2018 | Chang et al. |
| 10,430,407 | B2 | 10/2019 | Bhatt et al. |
| 10,482,394 | B2 | 11/2019 | Syed et al. |
| 10,747,761 | B2 | 8/2020 | Zhong et al. |
| 10,824,658 | B2 | 11/2020 | Bakis et al. |
| 10,872,083 | B2 | 12/2020 | Lin et al. |

(Continued)

FOREIGN PATENT DOCUMENTS

| | | |
|---|---|---|
| CN | 112270190 A | 1/2021 |
| CN | 112559690 A | 3/2021 |

(Continued)

OTHER PUBLICATIONS

Using Natural Language Processing in Order to Create SQL Queries (Year: 2008).*

(Continued)

*Primary Examiner* — Kim T Nguyen
(74) *Attorney, Agent, or Firm* — Fish & Richardson P.C.

(57) ABSTRACT

Methods, systems, and apparatus, including computer programs encoded on computer-storage media, for generating structured query language using machine learning. In some implementations, a system provides an interface configured to receive input comprising data processing criteria expressed in natural language text. The system receives natural language input through the interface, where the natural language input specifies one or more criteria for retrieving or generating data from a data set. The system obtains a structured query language (SQL) statement generated by an artificial intelligence or machine learning (AI/ML) model based on the natural language input, and the system provides the SQL statement through the interface.

20 Claims, 13 Drawing Sheets

(56) References Cited

U.S. PATENT DOCUMENTS

| | | | |
|---|---|---|---|
| 11,023,461 B2 | 6/2021 | Rumiantsau et al. | |
| 11,086,861 B2 | 8/2021 | Staar et al. | |
| 11,120,344 B2 | 9/2021 | Das et al. | |
| 11,295,194 B2 | 4/2022 | Romero | |
| 11,341,439 B2 | 5/2022 | Meharwade et al. | |
| 11,449,500 B2 | 9/2022 | Wang et al. | |
| 11,449,796 B2 | 9/2022 | Song et al. | |
| 11,455,306 B2 | 9/2022 | Maheshwari et al. | |
| 11,468,054 B2 | 10/2022 | Chaudhuri et al. | |
| 11,526,507 B2 | 12/2022 | Zhong et al. | |
| 11,550,783 B2 | 1/2023 | Lee et al. | |
| 11,562,044 B1* | 1/2023 | Du | G06F 16/148 |
| 11,567,965 B2 | 1/2023 | Liao et al. | |
| 11,625,620 B2 | 4/2023 | Singaraju et al. | |
| 11,682,390 B2 | 6/2023 | Temkin et al. | |
| 11,748,577 B1 | 9/2023 | Aberle | |
| 11,763,129 B2 | 9/2023 | Cao et al. | |
| 11,768,831 B2 | 9/2023 | Scholak et al. | |
| 11,775,868 B1 | 10/2023 | Song et al. | |
| 11,789,945 B2 | 10/2023 | Lee | |
| 11,803,541 B2 | 10/2023 | Zheng et al. | |
| 11,907,226 B2 | 2/2024 | Vo et al. | |
| 11,941,034 B2 | 3/2024 | Balakavi et al. | |
| 11,960,514 B1 | 4/2024 | Taylert et al. | |
| 11,960,575 B1 | 4/2024 | Sainani et al. | |
| 11,989,507 B2 | 5/2024 | Tunstall-Pedoe et al. | |
| 11,995,073 B2 | 5/2024 | Lee | |
| 12,039,285 B2 | 7/2024 | Ramanna et al. | |
| 12,061,970 B1 | 8/2024 | Lo | |
| 12,105,729 B1 | 10/2024 | Haq et al. | |
| 12,124,440 B1* | 10/2024 | Romero Calvo | G06F 16/24522 |
| 12,135,768 B2* | 11/2024 | Ailawadi | G06F 21/31 |
| 12,182,147 B1* | 12/2024 | Merchant | G06N 20/00 |
| 12,243,646 B1 | 3/2025 | Paul, Jr. et al. | |
| 12,265,570 B2 | 4/2025 | Siebel et al. | |
| 12,271,360 B1 | 4/2025 | Nguyen et al. | |
| 12,277,409 B1 | 4/2025 | Leeman-Munk et al. | |
| 12,307,203 B2* | 5/2025 | Goslin | G06F 40/279 |
| 12,332,876 B2* | 6/2025 | Cunningham | G06F 16/243 |
| 2007/0027905 A1 | 2/2007 | Warren et al. | |
| 2017/0262501 A1 | 9/2017 | Namboodiri et al. | |
| 2020/0134511 A1 | 4/2020 | Ho et al. | |
| 2020/0251111 A1 | 8/2020 | Temkin et al. | |
| 2020/0301925 A1 | 9/2020 | Zhong et al. | |
| 2020/0313924 A1 | 10/2020 | Park et al. | |
| 2020/0327196 A1 | 10/2020 | Sampat et al. | |
| 2020/0334233 A1 | 10/2020 | Lee et al. | |
| 2020/0387550 A1 | 12/2020 | Cappetta et al. | |
| 2021/0133234 A1 | 5/2021 | Bedadala et al. | |
| 2021/0173829 A1 | 6/2021 | Zeng et al. | |
| 2022/0058114 A1* | 2/2022 | Ranjan Jena | G06N 20/00 |
| 2022/0147515 A1* | 5/2022 | Nair | G06Q 40/04 |
| 2022/0358125 A1 | 11/2022 | Scholak et al. | |
| 2023/0169075 A1 | 6/2023 | Han et al. | |
| 2023/0306061 A1 | 9/2023 | Bui et al. | |
| 2023/0359617 A1 | 11/2023 | Misra | |
| 2024/0012810 A1 | 1/2024 | Lee | |
| 2024/0095491 A1 | 3/2024 | Birru et al. | |
| 2024/0202221 A1 | 6/2024 | Siebel et al. | |
| 2024/0281222 A1 | 8/2024 | Trummer | |
| 2024/0283757 A1 | 8/2024 | Lai | |
| 2024/0303263 A1* | 9/2024 | Ojha | G06F 16/383 |
| 2024/0330421 A1* | 10/2024 | Ailawadi | G06F 21/31 |
| 2024/0346256 A1 | 10/2024 | Qin | |
| 2024/0354567 A1 | 10/2024 | Duggal et al. | |
| 2024/0370478 A1 | 11/2024 | Twig et al. | |
| 2024/0370505 A1 | 11/2024 | Devaux et al. | |
| 2024/0378206 A1 | 11/2024 | Po | |
| 2024/0394249 A1* | 11/2024 | Cunningham | G06F 16/2425 |
| 2024/0394251 A1 | 11/2024 | Brende et al. | |
| 2024/0403367 A1 | 12/2024 | Dressler, II | |
| 2024/0404687 A1 | 12/2024 | Bell et al. | |
| 2024/0419705 A1* | 12/2024 | Kotaru | G06N 3/0475 |
| 2024/0428908 A1* | 12/2024 | Toscano, III | G06F 16/116 |
| 2025/0005051 A1 | 1/2025 | Khosla et al. | |
| 2025/0013636 A1* | 1/2025 | Romero | G06F 16/2433 |
| 2025/0036773 A1* | 1/2025 | Chihaia | G06F 16/22 |
| 2025/0061141 A1 | 2/2025 | Neervannan et al. | |
| 2025/0061290 A1 | 2/2025 | Gardner et al. | |
| 2025/0068741 A1 | 2/2025 | Lafon et al. | |
| 2025/0086215 A1 | 3/2025 | Kumar | |
| 2025/0094707 A1 | 3/2025 | Portisch et al. | |
| 2025/0111073 A1 | 4/2025 | Ho et al. | |
| 2025/0112878 A1 | 4/2025 | Bayless et al. | |
| 2025/0117386 A1 | 4/2025 | Agarwal et al. | |
| 2025/0147956 A1 | 5/2025 | Payani et al. | |
| 2025/0209065 A1* | 6/2025 | Choi | G06F 16/212 |

FOREIGN PATENT DOCUMENTS

| | | |
|---|---|---|
| CN | 111813802 B | 6/2021 |
| CN | 111522839 B | 9/2023 |
| CN | 117056351 B | 2/2024 |
| CN | 115168408 B | 5/2024 |
| CN | 113779062 B | 2/2025 |
| CN | 114896266 B | 5/2025 |
| EP | 3591586 A1 | 1/2020 |
| EP | 4428710 A1 | 9/2024 |
| EP | 4535197 A1 | 4/2025 |
| KR | 102277787 B1 | 7/2021 |
| KR | 102345568 B1 | 12/2021 |
| KR | 20220109978 A | 8/2022 |
| KR | 102737842 B1 | 12/2024 |
| WO | WO2021132760 A1 | 7/2021 |
| WO | WO2022072844 A1 | 4/2022 |

OTHER PUBLICATIONS

Wong et al., "A Survey of Natural Language Processing Implementation for Data Query Systems", Dec. 12, 2021, 8 pages.*

Assets.ContentStack.io [online], "Introducing MicroStrategy AI: Generative AI on Trusted Data," Oct. 2023, retrieved on May 2025, retrieved from URL<https://assets.contentstack.io/v3/assets/bltf8d808d9b8cebd37/bltc0f2f29968da1b01/6762e782f8f63ff47d198bd1/introducing-microstrategy-ai-generative-ai-on-trusted-data Oct. 3, 2023.pdf>, 4 pages.

Assets.ContentStack.io [online], "MicroStrategy Releases Auto, the Customizable AI Bot That Makes Enterprise Analytics Accessible to Anyone, Building on MicroStrategy AI," Mar. 2024, retrieved on May 2025, retrieved from URL<https://assets.contentstack.io/v3/assets/bltf8d808d9b8cebd37/blt85f4b0d2a1ff4d2d/6762ed94fd4cd54d802a783a/microstrategy-Releases-Auto-the-Customizable-AI-Bot-That-Makes-Enterprise-Analytics-Accessible-to-Anyone-Building-on-MicroStrategy-AI-Mar. 26, 2024.pdf>, 2 pages.

BigDataWire.com [online], "MicroStrategy Fleshes Out AI-for-BI Strategy, Bets Big On Bitcoin," Mar. 2024, retrieved on May 2025, retrieved from URL<https://www.bigdatawire.com/2024/03/27/microstrategy-fleshes-out-ai-for-bi-strategy-bets-big-on-bitcoin/>, 4 pages.

Wikipedia.org [online], "Data model," available on or before Apr. 12, 2023, via Internet Archive: Wayback Machine URL<https://web.archive.org/web/20230412211016/https://en.wikipedia.org/wiki/Data_model>, retrieved on May 2025, URL<https://en.wikipedia.org/wiki/Data_model>, 13 pages.

Wikipedia.org [online], "Database schema," available on or before Mar. 14, 2023, via Internet Archive: Wayback Machine URL<hhttps://web.archive.org/web/20230314195536/https://en.wikipedia.org/wiki/Database_schema>, retrieved on May 2025, URL<https://en.wikipedia.org/wiki/Database_schema>, 4 pages.

U.S. Appl. No. 18/596,738, filed Mar. 6, 2024, Abhyankar et al.
U.S. Appl. No. 18/653,504, filed May 5, 2024, Ojha et al.
U.S. Appl. No. 19/228,366, filed Jun. 4, 2025, Courcelle et al.

Ai.stackexchange.com [online], "What would be the best AI model to query a database in natural language?," added Dec. 15, 2023, modified Jan. 24, 2024, retrieved on Jun. 6, 2025, retrieved from URL <https://ai.stackexchange.com/questions/43138/what-would-be-the-best-ai-model-to-query-a-database-in-natural-language>, 2 pages.

(56) References Cited

OTHER PUBLICATIONS

Aws.Amazon.com [online], "Building a conversational business intelligence bot with Amazon Lex," Nov. 2018, retrieved on Jun. 6, 2025, retrieved from URL <https://aws.amazon.com/blogs/machine-learning/building-a-conversational-business-intelligence-bot-with-amazon-lex/>, 14 pages.
Celigo.com [online], "Natural language BI: Query your database with no-code AI solutions," Jan. 2024, retrieved on Jun. 6, 2025, retrieved from URL <https://www.celigo.com/blog/text-to-sql-access-databases-no-code-ai-solutions/>, 12 pages.
Chat2db.ai [online], "AI-driven data management platform Over 1 million developers are using Chat2DB," available on or before Jun. 23, 2024, via Internet Archive: Wayback Machine URL <https://web.archive.org/web/20240623125451/https:/chat2db.ai/en-us>, retrieved on Jun. 5, 2025, retrieved from URL https:/chat2db.ai/en-us, 6 pages.
Chat2db.ai [online], "Chat2DB," available on or before Nov. 1, 2024, via Internet Archive: Wayback Machine URL <https://web.archive.org/web/20241101193332/https://chat2db.ai/resources/docs/start-guide/getting-started>, retrieved on Jun. 5, 2025, retrieved from URL <https://chat2db.ai/resources/docs/start-guide/getting-started>, 12 pages.
Community.OpenAI.com [online], "Creating a Chatbot using the data stored in my huge database," Jun. 2023, retrieved on Jun. 6, 2025, retrieved from URL <https://community.Community.OpenAI.com/t/creating-a-chatbot-using-the-data-stored-in-my-huge-database/245942>, 48 pages.
Community.OpenAI.com [online], "How do i create a custom model for text to sql queries?," May 2023, retrieved on Jun. 6, 2025, retrieved from URL <https://community.Community.OpenAI.com/t/how-do-i-create-a-custom-model-for-text-to-sql-queries/205539>, 5 pages.
Einblick.ai [online], "What is LangChain? Why Use LangChain?," Mar. 2023, retrieved on Feb. 16, 2024, retrieved from URL <https://www.einblick.ai/blog/what-is-langchain-why-use-it/>, 10 pages.
Hong et al., "Next-Generation Database Interfaces: A Survey of LLM-based Text-to-Sql," Corr, Submitted on Jun. 12, 2024, arXiv:2406.08426v1, 17 pages.
Joseph et al., "AskYourDB: An end-to-end system for querying and visualizing relational databases using natural language," CoRR, Submitted on Oct. 16, 2022, arXiv:2210.08532v1, 9 pages.
Locusive.com [online], "Build A Custom AI Chatbot For Your Business Without The Hassles Of A Vector Database," available on or before Apr. 13, 2024, via Internet Archive: Wayback Machine URL <https://web.archive.org/web/20240413073150/https:/www.locusive.com/resources/build-a-custom-ai-chatbot-for-your-business-without-the-hassles-of-a-vector-database>, retrieved on Jun. 5, 2025, retrieved from URL <https://www.locusive.com/resources/build-a-custom-ai-chatbot-for-your-business-without-the-hassles-of-a-vector-database>, 15 pages.
Medium.com [online], "AI Chatbot with your Knowledge base," Feb. 2024, retrieved on Jun. 6, 2025, retrieved from URL <https://medium.com/databutton/ai-chatbot-with-your-knowledge-base-0390c8c6e5d8>, 19 pages.
Medium.com [online], "Ask YourDatabase: A New Plugin for ChatGPT," Jul. 2023, retrieved on Jun. 6, 2025, retrieved from URL <https://medium.com/@sheldonniu/askyourdatabase-a-new-plugin-for-chatgpt-e390828a3047>, 13 pages.
Medium.com [online], "Building a RAG System and Conversational Chatbot with Custom Data on your Local Machine," Feb. 2024, retrieved on Jun. 6, 2025, retrieved from URL <https://medium.com/@vikrambhat2/building-a-rag-system-and-conversational-chatbot-with-custom-data-793e9617a865>, 7 pages.
Medium.com [online], "Several Outstanding Text2Sql (Chat2Sql) Open Source Projects," Jul. 2024, retrieved on Jun. 6, 2025, retrieved from URL <https://medium.com/@tubelwj/several-outstanding-text2sql-chat2sql-open-source-projects-237de8496b93>, 21 pages.
Pandey et al., "Ensuring Data Accuracy in Text-to-SQL Systems: A Comprehensive Validation Framework," International Journal of Computer Trends and Technology, Dec. 2024, 72(12):17-24.
Seek.ai [online], "Text2SQL: An Overview of Past, Present and Future," May 2024, retrieved on Jun. 6, 2025, retrieved from URL<https://www.seek.ai/blog/a-survey-of-text-to-sqls-past-present-and-future>, 5 pages.
Singh et al., "A Survey of Large Language Model-Based Generative AI for Text-to-SQL: Benchmarks, Applications, Use Cases, and Challenges," CoRR, Submitted on Jan. 23, 2025, arXiv:2412.05208v2, 7 pages.
TTNews.com [online], "Using AI to Chat With Your Database, " May 2023, retrieved on Jun. 6, 2025, retrieved from URL <https://www.ttnews.com/articles/using-ai-voice-database>, 6 pages.
Zhao et al., "Chat2data: An interactive data analysis system with rag, vector databases and llms," Proceedings of the VLDB Endowment, Aug. 2024, 17(12):4481-4, 4 pages.
Zhu et al., "Large Language Model Enhanced Text-to-SQL Generation: A Survey," CoRR, Submitted on Oct. 8, 2024, arXiv:2410.06011v1, 18 pages.

\* cited by examiner

FIG. 4

GENERATING STRUCTURED QUERY LANGUAGE USING MACHINE LEARNING

CROSS-REFERENCE TO RELATED APPLICATIONS

This application claims priority to U.S. Provisional Patent Application No. 63/463,421, filed on May 2, 2023, and to U.S. Provisional Patent Application No. 63/463,511, filed on May 2, 2023, and the entire contents of both applications is incorporated by reference herein.

BACKGROUND

The present specification relates to generating structured query language (SQL) using machine learning.

SUMMARY

In some implementations, a computer system is configured to assist users by generating structured query language (SQL) statements and performing other operations to interface with a database or data source. The system can use a deep learning model, such as a large language model or neural network, to complement or replace existing rules and hard-coded SQL generation modules. Various types of artificial intelligence or machine learning (AI/ML) models can be used. The model can be trained to handle different types of operations and to adjust for the database schema or rules set by database architects to customize output for specific databases or users.

One way that the system can interface with users is through a chatbot-like interface. When a user launches a document, such as a dashboard or report, the system can provide an icon for initiating a conversation with a chatbot. The chatbot interface, powered by the trained machine learning model or other AI/ML model, allows the user to ask questions about the document being viewed and the underlying source dataset represented in the document.

As another example, the system can provide a chatbot-type interface for users to engage with while browsing database tables, data warehouse information, and other views of a dataset. The interface can enable a user to ask a question or specify a desired operation, and the system will provide sample SQL statements that the machine learning generates based on the user prompt. This can include retrieving records, filtering records, sorting records, generating metrics, generating visualizations, and so on. In addition, the system can support generation of SQL statements other operations such as to import data, change the structure of a data schema, refresh a data cube, and many other operations.

The system can also use the AI/ML models to enrich datasets. This can include adding attribute values or metric values that are predicted or inferred by the AI/ML model. For example, some objects or object types may include values for only a subset of the potential attributes defined in the system, so that field values for some records may be empty. As another example, a user or application may request a value for an attribute that is not stored or defined in the system. In these cases, the system can use a AI/ML model to generate an attribute value as needed, often on-the-fly as the information is requested. For example, if a record has partial information about an address, such as a street name and city, the AI/ML model can be used to generate a postal code. As another example, a food type may include some information, but not include a calorie count, and the system can use the AI/ML model to generate a representative calorie count to supplement the stored data.

The system can also use the AI/ML model to translate SQL statements to a natural language summary. In many cases, SQL statements can be difficult for users to understand. Through training with many example pairs of SQL statements and corresponding natural language descriptions, and with input of the relevant object model (e.g., attributes and schema) for a data set, the AI/ML model can generate a natural language summary for SQL statements that expresses the meaning and operations to be performed in a way the user can understand.

In one general aspect, a method performed by one or more computers includes: providing, by the one or more computers, an interface configured to receive input comprising data processing criteria expressed in natural language text; receiving, by the one or more computers, natural language input through the interface, wherein the natural language input specifies one or more criteria for retrieving or generating data from a data set; obtaining, by the one or more computers, a structured query language (SQL) statement generated by an artificial intelligence or machine learning (AI/ML) model based on the natural language input, wherein the SQL statement expresses the one or more criteria from the natural language input using references to components of the data set or logical objects of the data set; and providing, by the one or more computers, the SQL statement through the interface.

In some implementations, wherein the AI/ML model is a large language model.

In some implementations, the large language model has been trained based on examples of computer-generated SQL statements and corresponding user-edited SQL statements made by editing the computer-generated SQL statements.

In some implementations, obtaining the SQL statement comprises: (1) sending a request for the AI/ML model to generate the SQL statement, wherein the request includes (i) the natural language input or a natural language instruction the AI/ML model that is generated based on the natural language input and (ii) data indicating contents or structure of the data set; and (2) receiving the SQL statement that the AI/ML model generated, in which elements of the natural language input are mapped to or translated to components of the data set.

In some implementations, the data indicating the contents or structure of the data set comprises an object model or database schema for the data set.

In some implementations, obtaining the SQL statement comprises generating an instruction to a large language model based on the natural language text.

In some implementations, the method includes determining that the data set is relevant to the natural language input; and based on determining that the data set is relevant to the natural language input, selecting a data model for the data set. Obtaining the SQL statement comprises causing the AI/ML model to process the natural language input using the selected data model as context.

In some implementations, determining that the data set is relevant to the natural language input comprises: comparing terms of the natural language input to data models for data sets or metadata for data sets; and determining that the data set is relevant to the natural language input based on a match or similarity of the terms of the natural language input and the data model for the data sets or the metadata for the data set.

In some implementations, determining that the data set is relevant to the natural language input comprises: receiving data indicating an identifier for a data set used to provide content that is displayed in or selected on user interface content presented with a user interface in which the natural language input is entered; and determining that the data set is relevant to the natural language input based on the received identifier.

In some implementations, the method includes receiving the natural language input through an application programming interface (API).

In some implementations, the method includes: receiving the natural language input over a network from a user device; and providing the SQL statement to the user device over a network for display in a user interface of the client device.

In some implementations, the method includes providing the SQL statement to a database system; obtaining results that the database system generates based on executing the SQL statement; and providing at least a portion of the results or natural language text describing the results in response to the natural language input.

In some implementations, the criteria specified by the natural language input comprise one or more of a data set from which to retrieve data, a type of data to retrieve, a selection criterion, a filter criterion, or a sorting criterion.

In some implementations, the method includes: saving the SQL statement at a server system; creating an object representing the SQL statement or a set of results obtained from executing the SQL statement to obtain data from the data set; causing a representation of the object to be provided in a user interface, wherein the representation of the object is interactive and configured to provide, upon interaction by a user, access to the SQL statement or a set of results generated by executing the SQL statement.

In some implementations, the method includes forming an association between the object with the data set or a user, a document, or a project that is active when the natural language input is provided. The representation of the object is selectively caused to be presented based on the context of an application, wherein causing the representation of the object to be provided in the user interface is performed in response to determining that the user interface is associated with the data set or the user, the document, or the project.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIG. 4 is a diagram showing an example of a user interface providing a chatbot feature for a data browsing interface.

Like reference numbers and designations in the various drawings indicate like elements.

DETAILED DESCRIPTION

Figure 1:
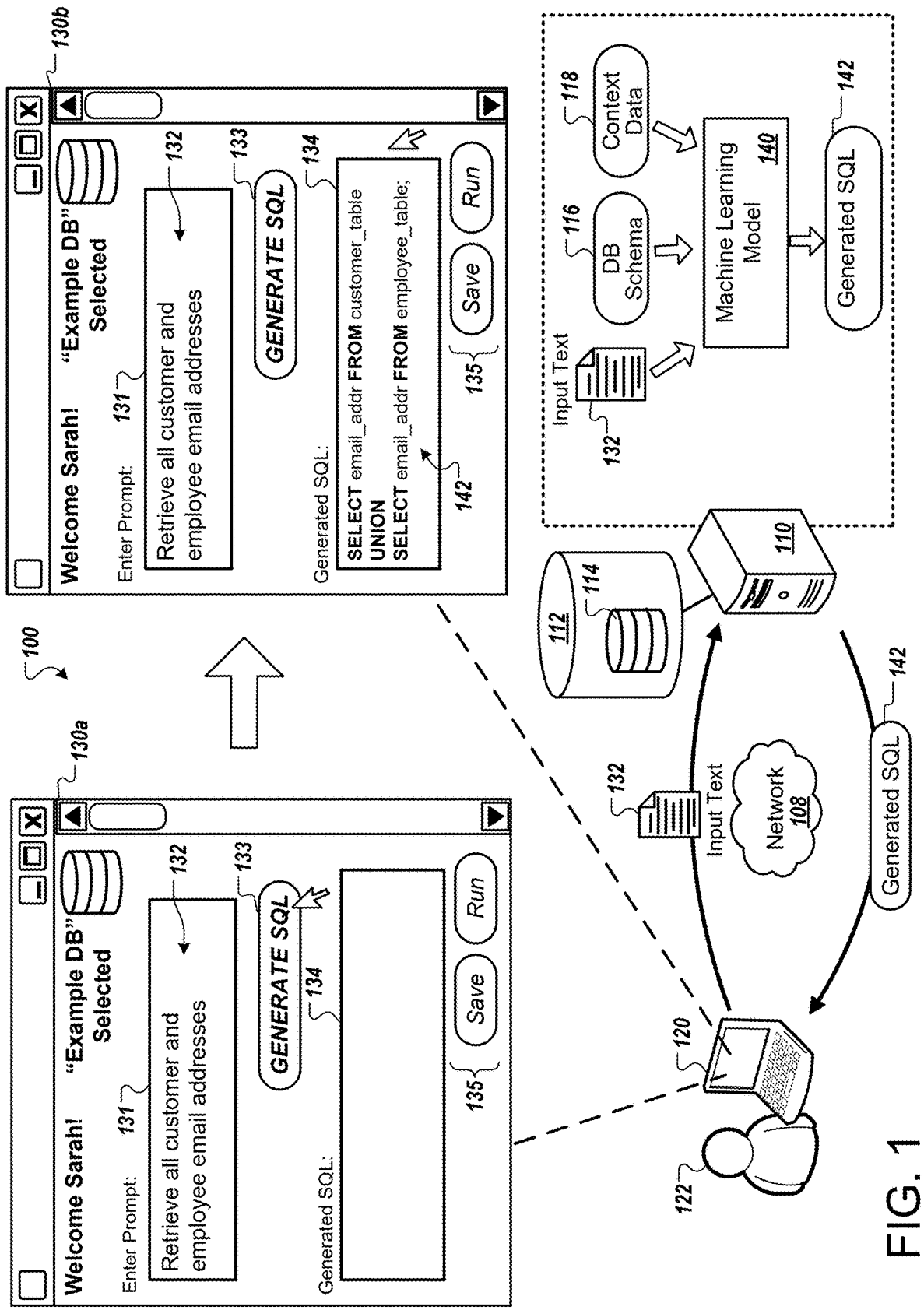
FIG. 1 is a diagram showing an example of a system for using artificial intelligence or machine learning to generate SQL statements.

FIG. 1 shows an example of a system 100 that can use machine learning or artificial intelligence to enhance user action with a database system. The system 100 includes a computer system 110 that accesses data storage 112. The computer system 110 receives data from and provides data to user devices over a network 108. For example, the user device 120 can receive interface data over the network 108 and can provide requests to the computer system 110 over the network 108. The network 108 can include public and/or private networks, such as the Internet, a wide area network, a local area network, a cellular network, and so on.

In the example of FIG. 1, the user device 120 initially presents a user interface 130a to access various features of the system. The user face 138 shows that the user, Sarah, has logged in and is working with a data source titled "example DB." These are interface 138 provides a text input field 131 in which the user 122 can enter a prompt or natural language statement representing the type of SQL statement to be generated. For example, the user 122 enters text 132 (e.g., a prompt such as a question, command, instruction, or other natural language content) "retrieve all customer and employee email addresses." The user then clicks a button 133 indicating that the system should generate an SQL statement based on the entered text.

In response to the user request, the user device 120 sends the entered text 132 to the computer system 110. Over the network 108. The computer system 110 uses information about the user 122, the context of the interface 130a in which the text 132 is entered, and characteristics of the data source to generate a SQL statement with an AI/ML model 140, such as a large language model (LLM). The AI/ML model 140 can be a large language model that has been trained on a very large number of text examples. The AI/ML model 140 has been further trained with examples of SQL statements and corresponding data, such as text descriptions, natural language requests, database schema information, object models, application context, data, and so on. As a result, the AI/ML model 140 has been trained to recognize, from the inputs it receives, likely phrases and characteristics used in different situations. In some implementations, the AI/ML model 140 is run in a cloud computing environment, potentially hosted and offered as a service by a third party. In other implementations, the AI/ML model 140 may be stored and run locally. Nevertheless, in many cases, the computer system 110 itself may be implemented using distributed computing platforms or cloud computing platforms.

For example, the AI/ML model 140 receives the text 132 that the user 122 entered. The AI/ML model 140 also receives at least a portion of the database schema 116 for the current data source, "Example DB." The machine learning model also receives context data 118, which can include information identifying the user 122, information about features or keywords present in the user interface 130*a* when the request was made, files or visualizations that are currently or were recently retrieved or presented for the user 122, and so on.

Based on the inputs, the AI/ML model 140 generates a SQL statement 142. The computer system 110 provides. The generated SQL statement 142 to the user device 120 over the network 108. The user device 120 then displays the user interface 130*b*, in which the generated SQL statement 142 is displayed for the user 122 to view and edit. For example, the user interface 130*b* can include a text field 134 that presents the generated SQL statement 142 and also allows the user 122 to click and directly edit the SQL statements if desired. These are interface 130*b* also includes interactive controls 135, such as buttons to cause the computer system 110 to save the generated SQL statement, run the generated SQL statement or perform other operations.

Figure 2:
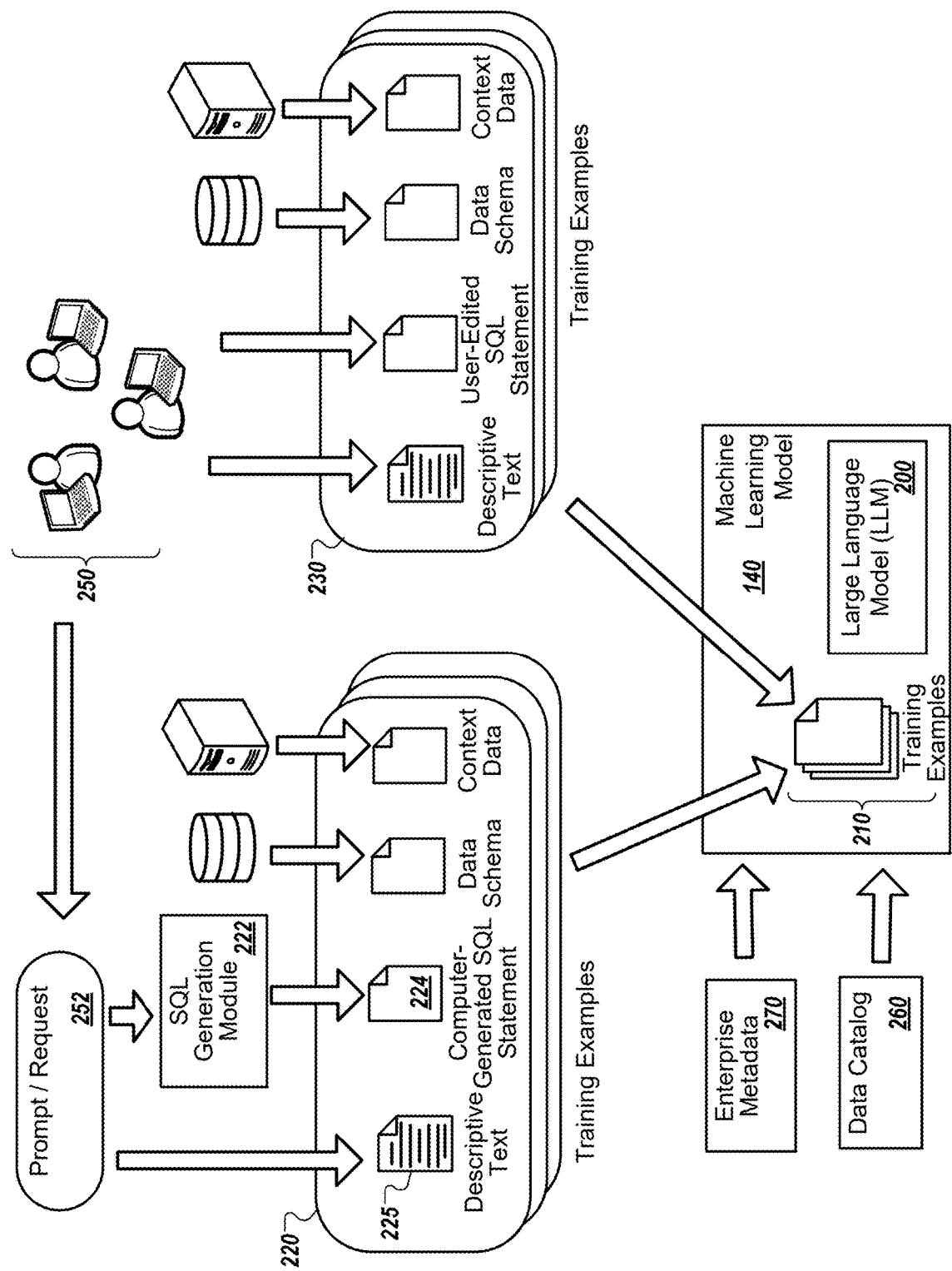
FIG. 2 is a diagram showing an example of an AI/ML model and training data used to train or fine-tune the model.

FIG. 2 shows additional details about the AI/ML model 140 and data that can be used to generate or improve the AI/ML model 140. The AI/ML model 140 can be or can include a large language model 200. This LLM 200 can be pre-trained by a third party to capture statistical information about many different words, phrases, and even computer code segments. As a result, the LLM 200 can capture relationships present in one or more natural language is such as English, Spanish, Italian, and so on. In some implementations, the LLM 200 may also have been trained at least in part using computer code segments from one or more programming languages or scripting languages, including SQL. The machine learning model 140 can include various training examples 210, or the LLM 200 trained or fine-tuned based on the training examples 210.

The training examples 210 provide additional context specific to the SQL generation task and/or other tasks for which the model is developed. For example, while the large language model 200 may be trained on millions and millions of different texts and examples. A smaller number of training examples 210, such as hundreds or thousands of training examples 210, may be provided to fine-tune the operation of the LLM 200 for a specific task or situation. In this example, training examples include descriptive text and a corresponding SQL statement for the descriptive text. The examples can include additional information as well, as discussed below. In some implementations, the values of weights of a neural network such as the LLM 200 are updated through training based on the examples 210. In some implementations, the training examples 210 or information derived from them are provided with requests to the LLM 200 as additional context with user prompts.

The example of FIG. 2 shows two sets of training examples. A first set of training examples 220 is generated using output of a SQL generation module that has been programmed and includes hard-coded rules and functions to generate SQL statements. A group of users 250 can generate prompts or requests 252 for SQL statements in the ordinary course of using a database system. The prompts and requests 252 are provided to the SQL generation module 222, which generates computer generated SQL statements 224 The user prompts or requests can serve as the descriptive text 225 for the training example. By generating training examples in this matter, the functionality of a previously created SQL generation module 222 can be represented and approximated or replicated using the AI/ML model 140. The training example can further include data schema information and context data to further provide context about the nature of a user's request and the available data sources and structure of the data set so the SQL statement can be generated appropriately.

A second type of training example 230 includes user edited SQL statements 234 and descriptive text 235 that user submitted to describe their own SQL statements 234. As another example, the descriptive text 235 can be generated by other users or administrators reviewing SQL statements that have been submitted. With these additional examples 230, the AI/ML model 140 can learn from complex examples and less common situations that may not be represented in the output of the SQL generation module 222.

In addition to the training examples 220, 230, the AI/ML model 140 can be trained using the user input or user feedback that is provided through use of the system. For example, in the example of FIG. 1, if the user 122 edits the generated SQL statement 142 when shown in the interface 130*b*, the edits and resulting edited SQL statement can be recorded and used to further train the AI/ML model 140. As a result, as users continue to use the features the model 140 supports, their positive and negative feedback can reinforce positive characteristics of generated results and inhibit errors or undesirable characteristics of generated results.

Both types of training examples 220, 230 can be stored in or with the AI/ML model 140, to provide a context and data set from which the LLM 200 can draw to generate SQL statements for new user inputs. In some implementations, the context provided by the training examples 210 represents a wrapper or additional component of the AI/ML model 140. In other implementations, the LLM 200 can be further trained or refined using the training examples 210, to result in a modified LLM 200 that incorporates the information from the training examples 210. In some implementations, the AI/ML model 140 can be updated or informed by information that is specific for a user, group of users, or organization. For example, a particular company or department within a company may have a particular data catalog 260 or repository of metadata 270 that indicates commonly used terminology and object definitions. Having this information for the AI/ML model 140 to learn from or to reference during generation can greatly improve the versatility of the AI/ML model 140 to handle the wide range of user requests that may be provided. And some implementations a semantic graph or similar data for an enterprise can be used for the same purpose. As a result, if a user submits a request that includes a reference to "SKU" but the training examples 210 and the current data schema do not reference this term, the AI/ML model 140 may nevertheless use instances of that term and it's mapping to other terms such as product identifier or product code to map the term to an appropriate portion of the data set that is relevant.

In some implementations, the system 110 uses training examples 210 to tune or adjust the output of single LLM 200 for different data sources or data sets. For example, different SQL characteristics may be desired for different types of databases, such as a Snowflake database and a mySQL database. One of the advantages of using training examples is that the LLM 200 can adapt the output to the characteristics of the particular data source or data set used. The system 110 can also provide the LLM, as input context to be processed with a user's natural language input text, preconfigured templates. The computer system 110 can retrieve one or more templates (e.g., output templates or templates of instructions to the LLM 200) from a repository of examples, so that the LLM 200 follows the right syntax, naming scheme, data schema, and so on.

Another way that an AI/ML model can be used is to use the AI/ML model to generate metadata for an enterprise from a data catalog or data source. In contrast to the example of FIG. 2, where a data catalog 260 is used to enhance or train an AI/ML model to generate SQL output, another technique is for an AI/ML model to be trained to receive a data catalog 260 as input and to generate metadata 270 or semantic graph data as an output. Many different organizations would benefit from deriving a data schema or metadata repository (e.g., an object model or data model) from a data catalog or data repository. As a result, a machine learning model can be trained with examples of (1) data sets or data catalogs and (2) corresponding data schema or metadata. Through training, the AI/ML model can learn to extract or infer the data schema or metadata for a data set or organization in response to receiving input of data catalog information or portions of the data set itself. Thus, the AI/ML model can use a data catalog as the source of the terminology for a schema or metadata repository. In some implementations, the generated schema or metadata repository is an intermediate representation that is used by a database system or by machine learning models for interacting with the data set, and it may not be presented or viewed by users. In some implementations, the generated schema or metadata includes an object model or data model that indicates logical objects of a data set, such as attributes, metrics, facts, or other types of data that can be derived from a data set. For example, the attributes or metrics may correspond to different columns of tables of a dataset, or may represent data that can be derived from those columns, such as by applying a function or equation to data in one or more columns of tables of a data set.

Figure 3:
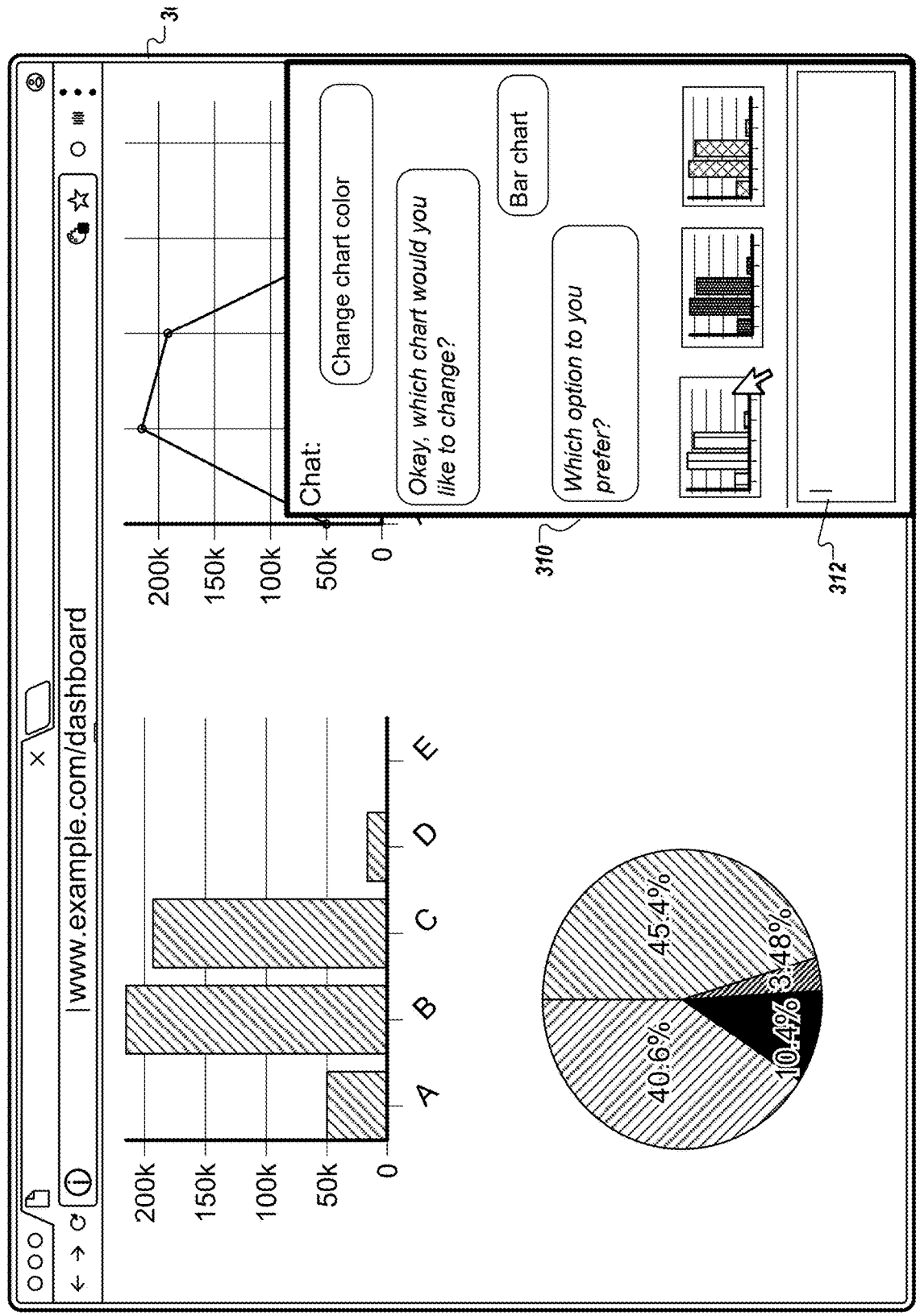
FIG. 3 is a diagram showing an example of a user interface providing a chatbot feature with an interactive document, such as a dashboard.

FIG. 3 shows an example of how the artificial intelligence and/or machine learning features can be accessed through a chat-style interface. The example shows a user interface 300, which shows a dashboard or other document. The chat interface 310 includes a text field 312 in which a user can make requests and ask questions about the current document and the underlying data source that is represented in the visualizations, tables and other data shown.

In the example, the user has made a request to "change chart color." The system, with interactions generated using the AI/ML model 140 or another model, generates a response asking which chart the user would like change. The user replies that the bar chart is the one to change. In response, the system uses the model 140 to generate different options that can carry out a type of change as requested by the user. For example, three different modified versions of the bar chart are shown with a question posed to the user of which option is preferred. The user can click one of the options to cause the system to update the main document with the formatting or other characteristics of the generated option selected. If the user does not prefer one of the three options shown, the user can continue interacting with the chatbot to make further requests or changes.

Figure 4:
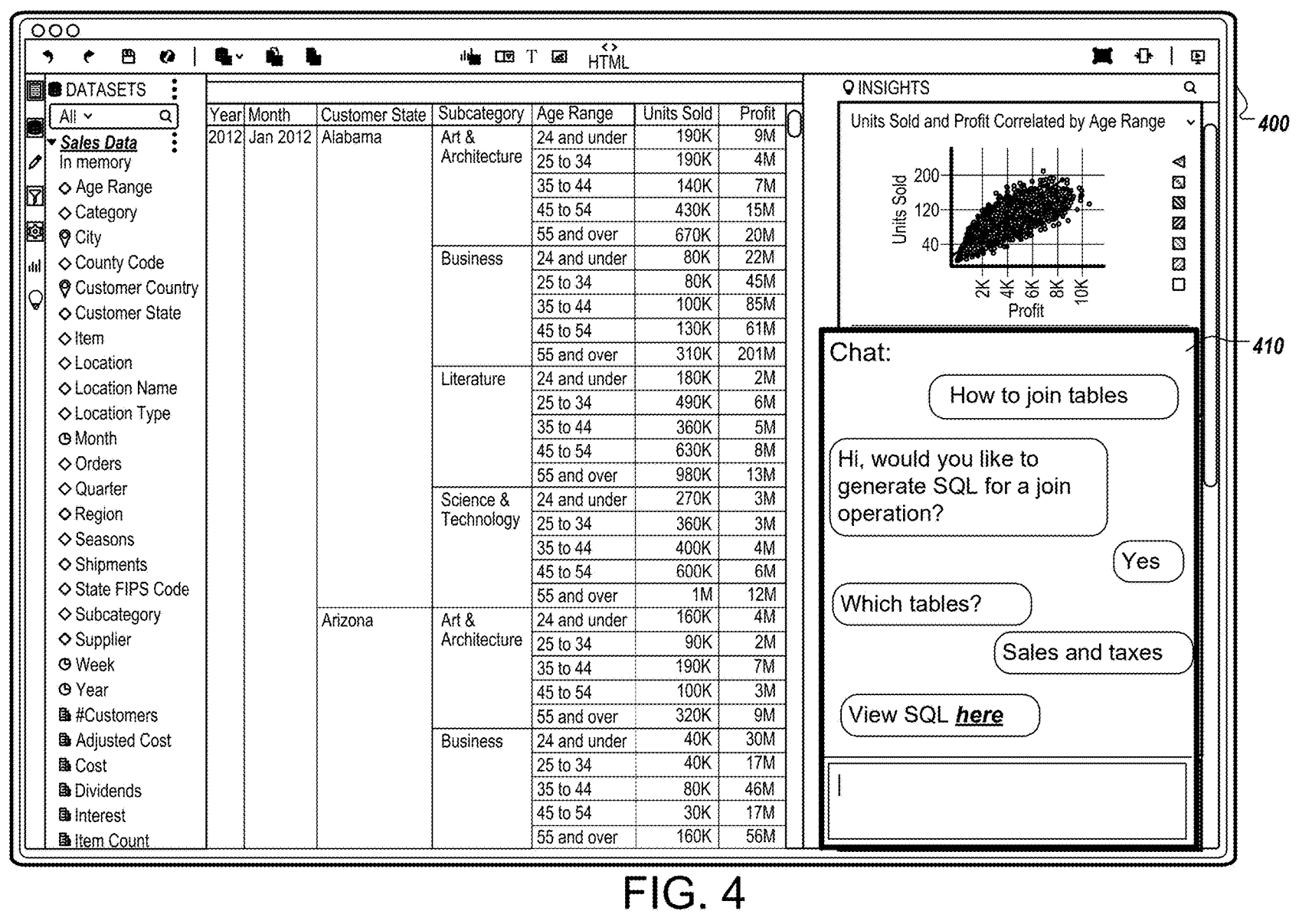

FIG. 4 shows another example of a chat-style interface for accessing artificial intelligence or machine learning functionality. The example shows a user interface 400 in which a user is viewing records of a data set. For example, the data set includes various attributes and metrics, various columns with different types of information, and so on. In the example, the user has clicked a button or icon to activate the chat interface 410. The user enters a statement," how to join tables. The chat bot, enabled by the AI/ML model 140, responds and ask the user a clarifying question, if the user would like to generate SQL for a join operation. The user replies and confirms, and the chat system asks which tables should be joined. The user replies that the sales table and taxes table should be joined, and the chat interface 400 provides the response generated using the model 140, which includes a reference to a generated SQL statement. The generated SQL statement is generated by the AI/ML model 140 based on the user's input in the chat interface 410, such as the indication to join tables, and the indication of which tables to use in the operation, e.g., the sales and taxes tables. The model 140 also uses the data schema and/or other information about the data set that is being viewed to generate the SQL statement. In addition, the model 140 can use a data catalog (such as a Collibra data catalog), object model, metadata repository, semantic graph, and/or other information providing context about the terminology that may be used in the chat interface and/or in the data set itself.

Figure 5:
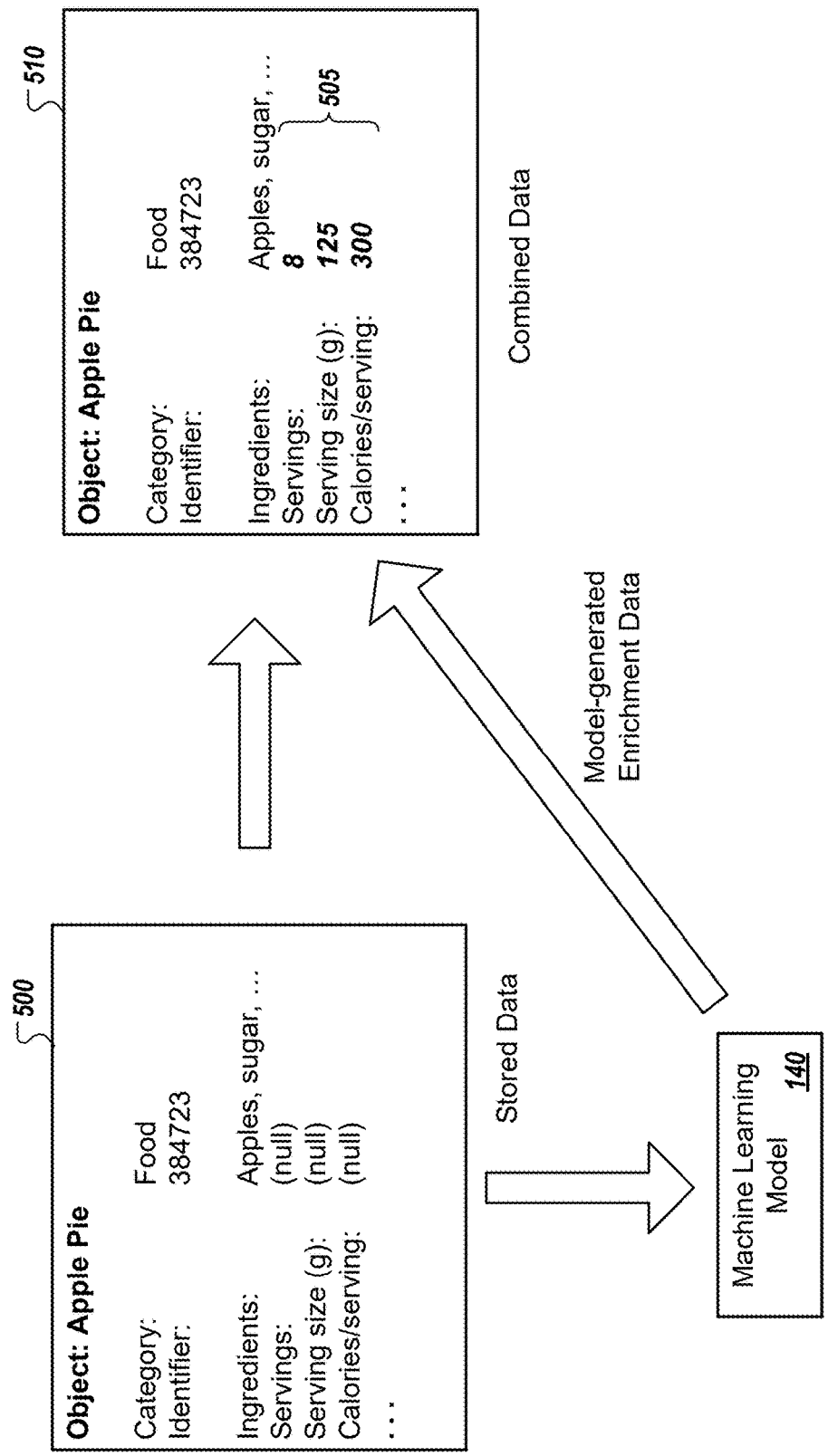
FIG. 5 is a diagram showing an example of using artificial intelligence or machine learning to enrich stored data.

FIG. 5 shows an example of using artificial intelligence or machine learning to enrich stored data. In many cases, records may not be entirely complete, or users may request information beyond the set of fields in a data set. In these situations, the AI/ML model 140 or another model specifically designed for the purpose can be used to enrich the data with model-generated values for attributes or metrics. In this manner, the AI/ML model 140 can predict or interpolate likely values that are representative for a given object or class of objects.

In the example, there is a stored record 500 for an object representing apple pie. Some information about the object is stored in the data set, including that. It is in the food category, that it has object identifier 384723, and the set of ingredients is also specified. Other attributes for the object, however, are not specified. For example, the number of servings, serving size, and number of calories per serving are attributes that do not have values populated when the record 500 is accessed, whether for display, for aggregation into a metric, for generating a data cube or visualization, for entry and a search index, or other purposes, The computer system 110 can use a AI/ML model 140 to enrich the data with values that go beyond what is stored in the data set or record 500. For example, if a user clicks to view the record 500, the computer system 100 can provide the record 500 and/or other contextual information to the AI/ML model 140 and receive a set of model generated enrichment data 505. In this case, the generated data includes a number of servings, a serving size, and a number of calories per serving. This information can be presented to the user to enhance or enrich the set of data that the user sees. The combined data. 510 includes both the attribute values from the stored record 500 and the generated attribute values 505 from the AI/ML model 140. With enriched data sets, the computer system 110 can provide enhanced filtering, aggregation, estimation, visualizations, and many other features.

Figure 6:
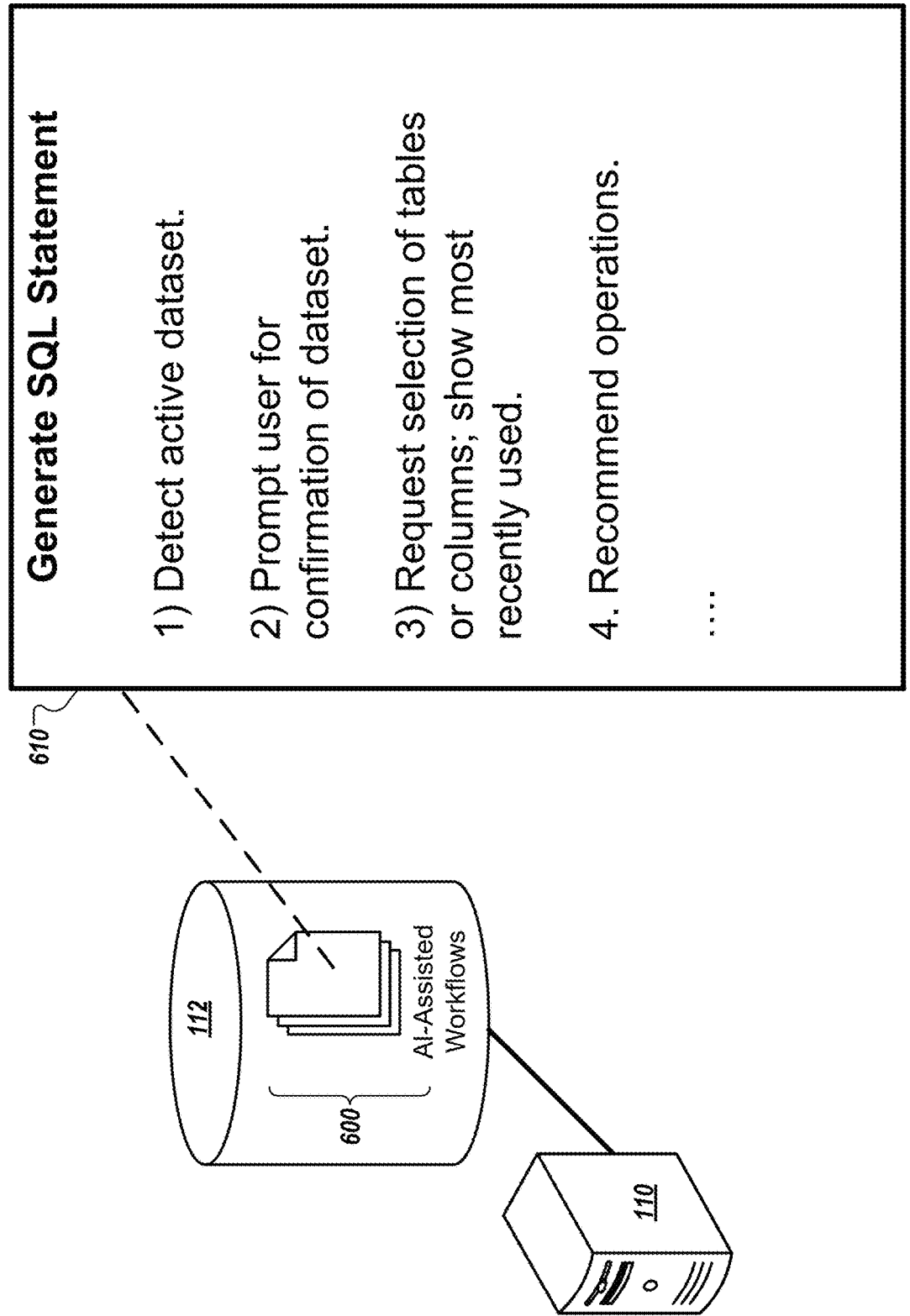
FIG. 6 is a diagram showing an example of using artificial intelligence or machine learning in workflows to guide user through tasks.

FIG. 6 shows one of various ways that machine learning and artificial intelligence can be leveraged in the computer system 110. In many cases, as discussed above, the keywords or prompt text for generating SQL statements may be available through a chat interface or other text field to enable the machine learning model 142 directly generate and appropriate SQL statement. In many cases, the data set that the SQL statement targets can be inferred from the on-dash screen contacts of the interface or other data contacts known by the system. 110. Nevertheless, for certain tasks or situations, it can be beneficial to guide the user in a workflow through incremental steps toward generating a high-quality SQL output. To best leverage the capabilities of the model 140, the computer system 110. Can store a variety of workflows 600 that can guide users through interactions that will provide the model 140 with the information needed to generate SQL outputs. The workflow 600 can be defined for various different tasks and situations, and so the computer system 110 can select an appropriate workflow 600 and use it to guide user interactions and use of the model 140.

In the example of FIG. 6, a particular workflow 610 is shown for generating a SQL statement. This workflow divides the overall task into a number of interactions in which the system 110 perform some operations, which may be done using the model 140. For example, the workflow 610 begins with detecting and active data set if one is present. Second, the workflow 610 indicates for the model 140 to be used to prompt the user for confirmation of the identified data set. Third, the workflow 610 indicates to request that the user select tables or columns to be used in the SQL statement, and the model 140 is used to generate options that the model 140 predicts are likely to be used. Fourth, the workflow 610 includes the model 140 recommending operations to link or use the different selected portions of the data set. The workflow 610 can continue with additional details and confirmation steps and data gathering, from the user or from other data sources, until the information needed to generate the SQL statement is present.

One of the advantages of using the workflow 600 is that they can be used for many different machine learning models. For example, different models may be tuned for different users, groups of users, departments, organizations, and so on. The workflows 600 may be mixed and matched with any of the appropriate machine learning models. As a result, a workflow such as workflow 610 may be developed and used for each of different users or organizations, and yet the use of different models with this workflow 610 can personalize the style of interactions and types of results generated. Of course, different users, groups of users, departments, organizations, and so on can each have their own customized or separate sets of workflows 600 that are used.

In general, the system 110 can be used to answer business user questions, and it can interpret the meaning and definitions of terms from the incorporated examples it has been provided. The model 140 can generate accurate SQL or other output, perhaps with multiple steps and prompts to users for confirmation. Rather than engineers writing code to perform SQL generation, engineers can write workflows for LLMs to guide end users through the process of performing certain tasks. Using the LLM, potentially with multiple steps, the system can take the user question and schema into a well-refined input set that the LLM or another model can use to complete a user's task.

By enabling the system 110 with machine learning model (s) that can generate and/or interpret SQL statements, the system 110 can abstract much of the work of interfacing with a database system. Eventually, the system 110 can assist many users so that they do not have to read or understand SQL to perform many data management and data analysis tasks. The arrangement also allows for much faster updating of the data analytics system, including the ability to make different functions modular through different machine learning models and workflows that rely on models. Trained models can incrementally and selectively replace hard-coded deterministic modules in the system 110 over time, as appropriate amounts of training examples are generated and quality of model output is verified.

Figure 7:
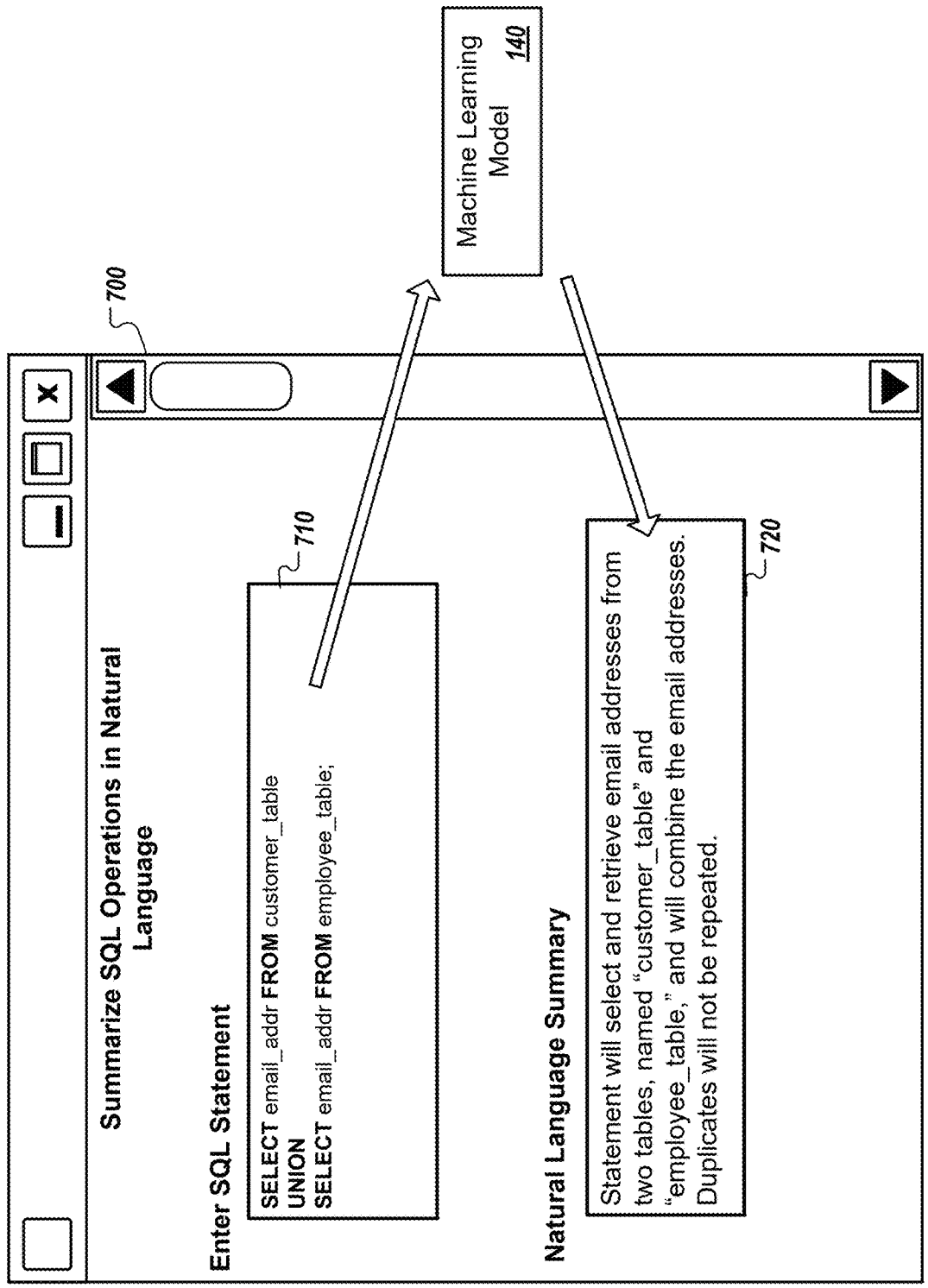
FIG. 7 is a diagram showing an example of using artificial intelligence or machine learning to translate SQL statements into natural language representations.

FIG. 7 shows an example in which the AI/ML model 140 is used to translate from SQL statements to natural language representations. For example, the AI/ML model 140 can be used to summarize SQL operations or to provide a natural language overview of the purpose or result of an SQL statement. In the example, a user can enter or select an SQL statement, such as shown in the text box 710 the AI/ML model 140, with learned information about relationships between SQL statements and natural language, then generates the output shown in text box 720 which describes, at least approximately, the operations performed or results achieved by the SQL statement in text field 710.

For example, to generate a natural language summary or natural language statement describing the SQL statement, the computer system 110 can send a request to the AI/ML model 140 that includes (1) a SQL statement, (2) an object model or data schema for the corresponding dataset (e.g., to indicate logical objects such as metrics and attributes, as well as tables, columns, etc.), and an instruction. The instruction can be a statement such as, "Generate a concise statement describing the operations performed by the accompanying SQL statement." The object model or data schema provides the link for the LLM 200 to understand the data objects referred to in the SQL statement, and describe those in the natural language output, e.g., using the labels or descriptions to translate from data object names or identifiers to a readable statement of the meaning or kind of data represented.

Figure 8:
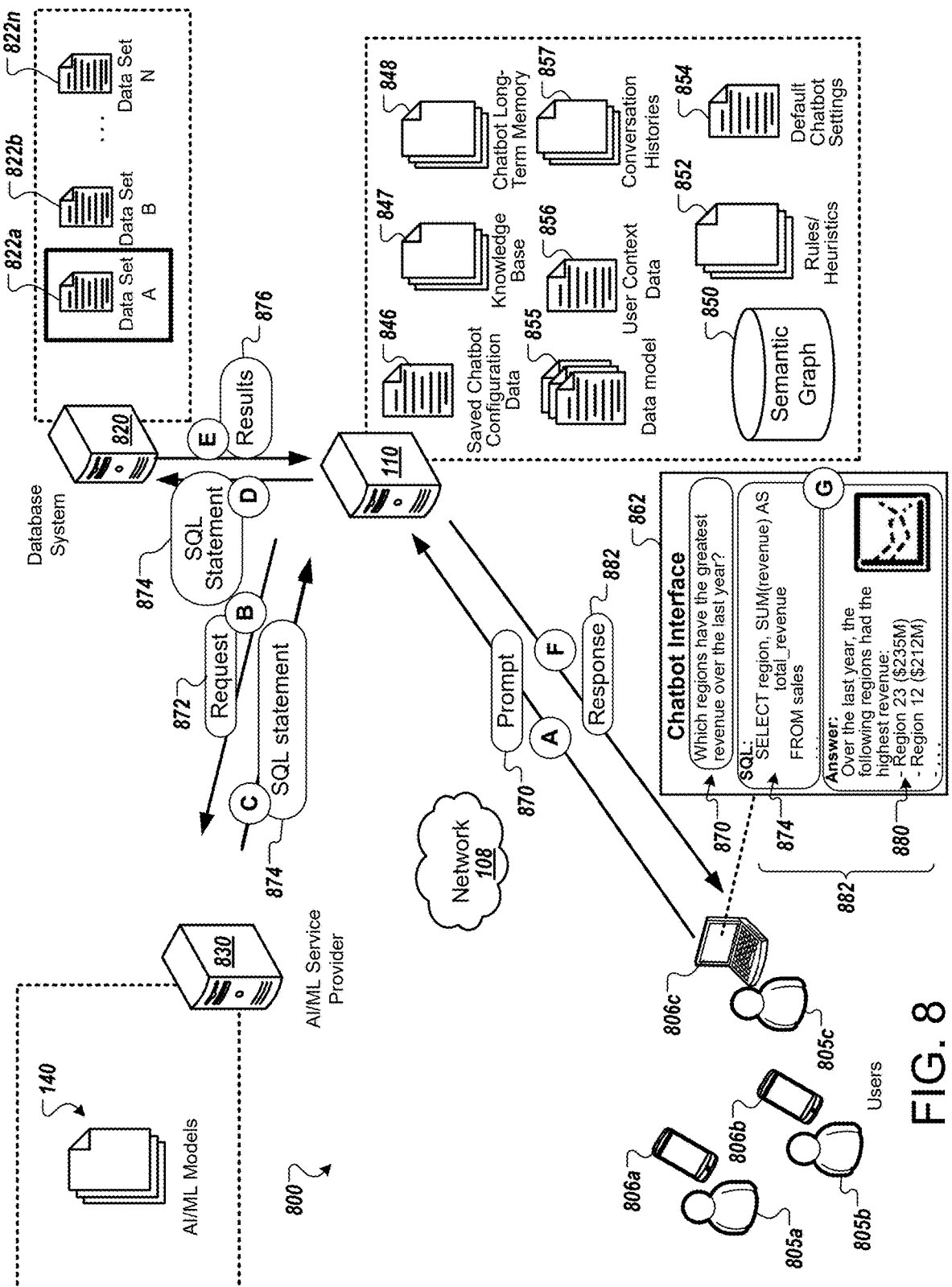
FIG. 8 is a diagram showing an example of a system configured to generate SQL statements using one or more AI/ML models.

FIG. 8 is an example of a system 800 configured to generate SQL statements using one or more AI/ML models 140. The system 800 can also be used to generate answers to users' questions about their data in a chatbot interface, to provide answers based on the generated SQL statement, as a direct answer to a user question or as a preview or example of data that is retrieved using the SQL statement.

The system 800 includes the computer system 110, a database system 820, and a AI/ML service provider 830. The elements of the system 800 communicate over the network 808, such as the Internet. The computer system 110 coordinates a variety of functions and access to the SQL generating capability to client devices 806a-806c of various users 805a-805c. For example, this functionality can be provided as a chatbot or messaging interface or other type of interface. The computer system 110 coordinates processing to generate and provide responses to user input, such as SQL generated in response to a user's input prompt.

The computer system 110 can be implemented using one or more servers, including one or more cloud computing systems. For example, the computer system 110 can be an application server. The computer system 110 provides front-end functionality to interface with various client devices. The interface can be an application programming interface (API), a user interface (e.g., by providing user interface data for a web page or web application), or another type of interface.

The database system 820 can provide various data retrieval and processing functions. For example, the database system 820 can be a database management system (DBMS), and can include the capability to perform operations specified in structured query language (SQL), Python code, or in other forms. The database system 820 has access to various data sets 822a-822n, which can be private data sets for organization, such as a company. The database system 820 can store and use data sets in any of various forms such as tables, data cubes, or other forms.

The AI/ML service provider 830 can be a server system or cloud computing platform that provides access to one or more AI/ML models 140, such as LLMs. The computer system 110, the database system 820, and the AI/ML service provider 830 may be implemented as separate systems or may be integrated in a single system. For example, the AI/ML service provider 830 can be a third-party service or can be managed and operated by the same party as the computer system 110 and/or the database system 820.

In the example of FIG. 8, a user 805c interacts with a chatbot interface or other interface to provide data processing criteria. For example, the user 805c accesses a user interface 862 for a chatbot. The user interface 862 includes a field in which the user can enter a question, statement, or other user prompt 870 in natural language text. In the example, the user 805c enters the prompt 870, "Which regions have the greatest revenue over the last year?," and the user's client device 806c sends the prompt 870 to the computer system 110 for processing. The computer system 110 receives the prompt 870 and begins a series of interactions used to generate a response to the prompt 870. The computer system 110 can use the AI/ML model 140 to generate a SQL statement that maps the concepts and criteria of the prompt 870 to one or more data sets 822a-822n, e.g., private data sets of the user 805 or the user's organization potentially together with information from public data sets. The response to the prompt 870 can include the SQL statement 874 generated by the AI/ML model 140, and the user device 806c and present the SQL statement 874 for the user 805c to view and edit.

In addition, or as an alternative, the response can include an answer 882 that is based on results 876 retrieved by executing the SQL statement 874. For example, the response can include a summary 880 of the result 876, in a natural language description or explanation of the data retrieved. As another example, the response can provide a data preview, such as showing example values or rows of data that would be retrieved or generated by executing the SQL statement 874.

As discussed above, the computer system 110 can provide various types of information to be used by the AI/ML model 140 in generating SQL or other responses. For example, the AI/ML model 140 can be an LLM, and in addition to providing the prompt 870 from the user, the computer system 110 can provide other information as context, including a database schema. As another example of context that can be provided to the AI/ML model 140, the computer system 110 can also provide a knowledge base 847 that can include, for example, descriptions of terms that may have a unique meaning in the particular context of the user. The knowledge base 847 may be shared by multiple chatbots or even all chatbots associated with the company or organization of the user. When the computer system 110 establishes a new session of the chatbot and a user, the computer system 110 can provide the knowledge base 847 as part of initializing the session with the AI/ML model 140. As a result, the knowledge base 847 can provide additional context for all of the subsequent interactions with the AI/ML model 140. In other implementations, some or all of the knowledge base 847 can be provided with each request made to the AI/ML model 140.

In addition, the context provided to the AI/ML model can include information in a long-term memory 848 that is stored and managed by the computer system 110. The long-term memory 848 can be information that has been learned through previous interactions with the current user or users. This information can be provided upon initialization of the chatbot interface, in the same manner the knowledge base 847 is provided, or can be provided in other ways. For example, the information from the long-term memory 848 can be selectively and contextually applied, as the computer system 110 analyzes the prompt 870 and the situation of the user 805c and determines whether there is information in the long-term memory 848 that is relevant to the content of the prompt 870. The retrieved content of the long-term memory 848 that the computer-system 848 determined to be relevant to the prompt, can then be provided with the prompt 870. As another example, certain information in the long-term memory 848 may be applicable to a specific user, role, or permission level, and the computer system 110 can provide that information in response to determining that the user 805c submitting the prompt 870 is that user or has that role or permission level. In other cases, the information in the long-term memory 848 supplements or alters the general instructions or initialization commands for starting the chatbot session, either in all cases or selectively when specific prompt content or user context is detected.

In stage (A), the user 105c enters the prompt 870 in the user interface 862, and the user device 806 sends the prompt 870 to the computer system 110 over the network 108. The prompt 870 includes natural language text describing the data the user 805c is interested in, by specifying some criteria for retrieving or generating data. The prompt 870 may be expressed as a question, an instruction, a set of criteria, or other form. In the example, the prompt 870 is, "Which regions have the greatest revenue over the last year?"

The computer system 110 can provide an interface for prompts or other natural language text to be provided, such as by providing an application programming interface (API) that defines the commands or communication channels through which the user interface 862, or an application providing the user interface 862, can send prompts to be processed. As another example, the computer system 110 can send user interface data, such as web page content, web application content, etc., that when rendered at the user device 806c causes the user interface 862 to be provided.

The user device 806c can also identify contextual information about the user 805a, the user interface 862, and the user device 806c, and provide that contextual information to the computer system 110 in association with the prompt 870. For example, the user interface 862 may be shown alongside, integrated with, or as a pop-up or overlay region for other content, such as a document or another application. The other content may involve one or more data sets 822a-822n managed by the database system. For example, the content may be derived from or show information from a particular data set 822a. As an example, the user 805c may enter the prompt 870 while a particular document is open, or a particular visualization or data range is selected, or while a dashboard is being edited. The user device 806 can identify the content items that are active (e.g., open, displayed, selected by the user, etc.) at the time the user 805c enters the prompt 870 or shortly before (e.g., a previous window of time, such as 1 hour, 1 day, 1 week, etc.). The user device 806 can then identify the data objects (e.g., data sets 822a-822n, tables, columns, rows, logical objects (e.g., attributes, metrics, etc.)) that are associated with those content items (e.g., as specified in metadata for the content items).

The user device 806 can then send, to the computer system 110 over the network 108, data that identifies the content items in the context of the user device 806a and/or the identified data objects. These items can help the computer system 110, and eventually the AI/ML model 140, to more accurately interpret the prompt 870, to disambiguate vague references in the prompt 870, and to better map the prompt 870 to data objects in the data sets 822a-822n.

In stage (B), the computer system 110 receives the prompt 870 through the interface the computer system 110 provides (e.g., API, web page, web application, etc.). In response to receiving the prompt 870, the computer system 110 generates and sends a request 872 to the AI/ML service provider 830. The request 872 includes the prompt 870 and requests that the AI/ML model 140 generate a SQL statement 874 to retrieve the type of data indicated in the prompt 870. The request 872 can also include other information included as input for the AI/ML model 140 when processing the prompt 870 (e.g., context for the prompt 870), including a data model 855 (e.g., a database schema) for one or more data sets 822a-822n, a knowledge base 847, a chatbot long-term memory 848, user context data 856 for the user 805c, conversation histories 857 (e.g., prior conversation content for conversations with the chatbot), and/or content from a semantic graph 850.

As a simple example, the prompt to an LLM in the request 872 may include an instruction such as "Generate a SQL statement for <<user prompt>>," where the prompt 870 is inserted in the field "<<user prompt>>." The request 872 can be a request for a SQL statement or Python code that, when interpreted or executed by another system such as the database system 820, will cause the other system to retrieve and/or generate a focused subset of data (e.g., a result data set) from the data set 822a that can be used to answer to the prompt 870 from the data set 822a. The request 872 can also include one or more custom instructions that the administrator 803 specified, to further orient the AI/ML model 140 to generate data processing instructions that are most applicable for the tasks, situations, purposes, or users that the chatbot is designed for. In some cases, one or more custom instructions are appended or otherwise included with the user prompt 870 in the first request 872.

Many AI/ML models 140, such as LLMs, operate in a substantially stateless manner, in which a general model 140 does not automatically include context of previous interactions or specific knowledge about the chatbot being used. In order for the AI/ML model 140 to be able to appropriately answer the request 872 and provide an accurate SQL statement in response to the prompt 870, the computer system 110 can identify one or more data sets 822a-822n that are relevant to the prompt 870 and provide information about the identified data sets 822a-822n.

The computer system 110 can identify a particular data set that is relevant to the prompt 870 in various ways. For example, the computer system 110 can use the identification of a data set that is provided by the user device 806c. The computer system 110 can receive from the user device 806c information identifying a particular data set 822a that is active at the user device 806c (e.g., being used or edited, etc.) or that is associated with a portion of a user interface at the user device 806c (e.g., a data set from which data is used to provide a document, document section, document page, visualization, etc. that is in a user interface of the user device 806c). As another example, the user may have recently interacted with or selected particular data elements or content items, and so the user device can indicate the data sets associated with those content items. In some cases, the application or chatbot that a user 805c is interacting with has a specific data set 822a-822n, and that data set can be indicated to the computer system 110. When there are particular data objects, such as specific attributes or metrics, associated with these content items (e.g., such as the particular attributes or metrics shown in a charter graph), that information can be identified and provided to the computer system 110 as well. In some implementations, the user device sends object identifiers for the content items, even if the associated data sets are not known to the user device 806c. The computer system 110 can use the semantic graph 850 or other records to look up the characteristics of those content items and determine which data sets 822a-822n are associated.

As another example, the computer system 110 can examine the prompt 870 itself to determine which data set(s) 822a-822n are relevant. For example, the computer system 110 can compare terms in the prompt 870 with metadata or data models 855 for the data set(s) 822a-822n to select the data set(s) 822a-822n that are most similar. In doing so, the computer system 110 can compare the terms of the prompt 870 with names for particular logical objects (e.g., attributes or metrics), labels for data elements (e.g., labels for tables, labels for columns, etc.), and other metadata to find matches or assess similarity. As another example, the computer system 110 can identify relevance of the prompt 870 with data set(s) 822a-822n by searching for related data sets 822a-822n, or their components or data objects, using the semantic graph 850, which can include objects representing data sets, data objects, and many more items in an enterprise environment, as well as connections and relationships among them.

With this information, the computer system 110 identifies one or more data sets 822a-822b that are identified as or estimated to be most relevant to the prompt 870. In the example, the computer system 110 identifies the data set 822a to be most relevant to the prompt 870. For example, the user 805c can have a document that includes data from the data set 822a open at the time the prompt 870 is entered. As another example, the data set 822a can include financial information, and the computer system 110 can determine that the term "revenue" relates to this type of financial information based on the column labels and other metadata for the data set 822a.

As a result of identifying the data set 822a as relevant to the prompt 870, the computer system 100 includes with the request 872 information about the data set 822a and the database system 820. For example, the request 872 can include metadata about the structure and type of content of the data set 822a, without including actual data of the data set 822a. For example, the metadata may include a database schema, a description of the data objects available from the data set 822a (e.g., logical data objects such as metrics, attributes, facts, etc.), an identification of data set 822a components (e.g., tables, columns, etc.) and a description or classification of semantic meaning of those components, and so on. The request 872 may also include sample data, such as a few rows of data or fictitious computer-synthesized data that is of the same type and structure as the data set 822a, but does not include the actual values from the data set 822a. For example, the request 872 can indicate the types of data in the data set 822a, and/or include a sample row or rows of data from the data set 822a, potentially using synthetic data to avoid revealing data of the data set 822a.

The request 872 can include a data model 855 that includes information about the data set(s) that the chatbot will use to respond to the request 872, without including actual data from the data set 822a. If multiple data sets 822a-822n are selected as relevant to the prompt 870, or if it is unclear which data set 822a-822n is related to the prompt, multiple data models 155 can be provided, one for each of various different data sets 822a-822n that are likely and/or available (e.g., authorized for the user 805c to access). The AI/ML model 140 can then use the prompt 870 and information in multiple data models 855 to identify the correct data objects to use (e.g., best fit for the concepts or terms in the user's prompt 870) across the various data sets 822a-822n for which data models 855 are provided.

The data model 855 can include a data schema for the data set 822a. In general, the data model 855 can indicate a list of logical objects represented in the data set 822a, such as a list of the elements or components of the data set. For example, the data model 855 can indicate that the data set 822a includes logical objects such as date, customer identifier, region code, sales amount, and so on. These data objects can represent quantities or data objects that are represented in, or can be derived from, data in the data set 822a. The logical objects, such as metrics or attributes, can represent the type of data that is stored in or derived from a column of data. For example, an attribute may represent a type of data stored in a column of a data table or the result that would be obtained by applying a particular arithmetic expression to data in a column. Similarly, a metric or fact can represent the result of applying a particular aggregation function or other operation(s) to values in one or more columns of a data table. Accordingly, the data model 855 can indicate the attributes and metrics that are available for the AI/ML model 140 to work with, and potentially additional attributes or metrics that can be generated or operations that are available for the database system 820 to create new attributes or metrics.

In some cases, the data model 855 can indicate, through the logical objects identified, types of data from tables, columns, and other elements that make up the data set 822a, in addition to or instead of the semantic meanings and/or relationships among these elements of the data set 822a. For example, the data model 855 can indicate that the data set 822a includes set of data named "sales_table," that includes a metric named "sales_amount" that indicates amounts of sales and another attribute named "region" that indicates the region in which the sale occurred. These quantities may or may not correspond directly to the structure of the data set 822a. For example, the item "sales_table" may be an actual data table of a database, or may not represent a table and instead another grouping of data. Similarly, the "sales_amount" and "region" objects may correspond to specific columns of a data table, but may alternatively represent values that can be calculated or otherwise derived from the data set 822a in another way. Providing the data model 855 can give the AI/ML model 140 a list and description of the logical objects that the database system 820 recognizes. As a result, the AI/ML model 140 can generate code or instructions that reference these logical objects that are understood by the computer system 110 and the database system 820. To the extent that the objects indicated in the data model 855 differ from the actual structure of the data set 822a, the computer system 110 and the database system 820 can use convert from the logical object names used in the data model 855 to actual data set elements and functions. In some implementations, the data model 855 is the same data model that the data base system 822a uses to map logical objects to the data set 822a.

The data model 855 can indicate the names or labels for these data elements, classifications of the elements (e.g., metric, attribute, etc.), and other information. In some implementations, the data model 855 can include sample data for the data set 822a, such as a sampling of data from the data set 822a. The sample data can be fictitious example data that may be artificially synthesized to be representative of the data in the data set 822a (e.g., similar types of data), without indicating actual contents of the data set 822a. The data model 855 can be provided in any of various forms, such as a database schema from a database management system, a list or definitions of objects, components, or identifiers of the data set 822a, etc.

By providing the data model 855 with the request 872, the computer system 110 provides the AI/ML model 140 the ability to make use of the logical objects specified in the data model 855. As a result, the AI/ML model 140 can determine the types of data that would be available from the data set 822a, even without the AI/ML model 140 having any access to the data set 822a. The AI/ML model 140 can generate code or instructions (e.g., a SQL statement) that references these logical objects, with a clear set of names or other identifiers to accurately and unambiguously reference components of the data set 822a. For example, providing the data model 855 for the data set 822a, may enable the AI/ML model 140 to reference logical objects in generated SQL statements that the computer system 110 and/or database system 820 can unambiguously map the logical objects to tables and columns of the data set 822a. This allows the AI/ML model 140 to distinctly and unambiguously define criteria to specify the subset or portion of data to be retrieved from, or calculated based on, the data set 822a.

In addition, access control restrictions can be taken into account to adjust which data can be used. For example, the computer system 110 can generate the request 872 so that the AI/ML model 140 does not use or rely on portions of the data set 822a that the user 140 does not have authorization to access. For example, the data model 855 provided with the request 872 can be a modified version of the data model 855 for the data set 822a that identifies only the logical objects or portions of the data set 822a that the user 805c is authorized to access, and excludes portions of the data set 822a that the user 805c is not authorized to access. As a result, the AI/ML model 140 will not be aware of data sets or data objects that should not be accessed on behalf of the user 805c.

The computer system 110 can provide other knowledge assets for the AI/ML model 132 to use, such as the one or more knowledge bases 847. In some implementations, the knowledge base(s) 847 have been specified to be used (e.g., in settings of an administrator for the organization as a whole or for the chatbot or interface 862 in particular), and the knowledge based 847 can be included in their entirety with the first request 872, or were provided previously (e.g., during initialization of a chat conversation with the AI/ML model 140).

In some implementations, the computer system 110 can perform or coordinate a selection or retrieval process to identify a subset of the knowledge asset content that is relevant to the prompt 870. For example, the computer system 110 can perform keyword matching to identify portions of a knowledge base 847 that match terms of the prompt 870. As another example, portions of the knowledge bases 847 or other knowledge assets can be selectively retrieved using semantic similarity. For example, the knowledge bases 847 can be entered in a vector database and represented with embeddings or positions in a high-dimensional vector space. The computer system 110 can represent the prompt 870, or separate chunks or portions of the prompt 870, in the vector space and identify the portions of the knowledge bases 847 that are relevant the prompt.

The process of retrieving knowledge base content can be one of multiple retrieval-augmented generation (RAG) retrieval steps. For example, one retrieval or selection step can be used to select content from one or more knowledge assets to be provided to the AI/ML model 140 with the first request 872. As discussed below, the response of the AI/ML model 140 can then be used to retrieve data from the data set 822a (e.g., as done by the database system 820), which can be a second RAG retrieval step.

In addition or as an alternative to providing other knowledge asset content, the computer system 110 can select content from the semantic graph 850 to include with the request 872. The semantic graph 850 represents a source of knowledge that can be applied to a variety of prompts. Generally, the semantic graph 850 is large for an organization and, for any given prompt, the semantic graph 850 includes many elements that are not relevant to the prompt. As a result, the computer system 110 can identify entities and relationships relevant to the prompt 870 as an initial step, and extract information about those entities and the entities they are connected to in the semantic graph 850. For example, the computer system 110 can identify a small sub-network from the semantic graph, as a small knowledge graph of elements related to or connected to terms, entities, or data objects referenced in the user prompt 870. With this information, the computer system 110 can improve its interpretation of both the prompt 870 and the other knowledge assets, such as the knowledge bases 847.

The request 872 can be generated or adjusted based on information in the long-term memory 848 and/or information related to the user. For example, given the user interactions or feedback received through previous prompt-response cycles with the user 805c and/or other users, the long-term memory 848 may include information that can clarify what users intend when they provide a prompt with content or characteristics of the prompt 870. For example, the long-term memory 848 may specify that a visualization should be included, or that data should be ordered in a particular way. In addition, the computer system 110 also stores information about the user 805c and his current context, represented as user context data 856. This user context data 856 can indicate, for example, the identity of the user, permissions of the user, a device type of the user's device 806c, a location of the user, a role of the user, a department of the user, and so on. In addition, the computer system 110 stores conversation histories 857 of users that have previously interacted with the chatbot. As a result, information about previous prompts from the user 805c and previous responses, in whole or in part (e.g., in summary form) and from the current session and/or previous sessions, can be retrieved and used to supplement the prompt 870. The computer system 110 can provide the user context data 856 and conversation history 857 for the user 805c in or with the request 872, so the AI/ML model 140 can generate data processing instructions with the context of the user's situation and previous conversations, which may better explain or help disambiguate the most recent prompt 870.

In stage (C), in response to the request 872, the AI/ML service provider 830 uses one or more of the AI/ML models 140 to generate a response to the request 872. The AI/ML service provider 830 then sends the generated SQL statement 874 as a response to the computer system 110. As discussed above, the request 872 requests SQL content specifying the processing operations that the database system 820 can use to retrieve and/or generate (e.g., calculate) from the data set 822a the result data that would meet the criteria of the user prompt 870. As a result, the AI/ML service provider 830 uses the AI/ML models 140 to generate the SQL statement 874 that, when executed by the database system 820, will retrieve and/or generate the data needed to answer the prompt 870, which is in this case, the user's question.

For example, in response to the user's prompt 870, the AI/ML model 140 generates the SQL statement 874:
SELECT region, SUM (revenue) AS total_revenue
FROM sales
WHERE date>=DATEADD(year, -1, GETDATE( ))—considering last year's data
GROUP BY region
ORDER BY total_revenue DESC;

This SQL statement will select the region column, calculate the total revenue for each region using the SUM ( ) function and alias it as total_revenue, filter the data to consider only records from the last year using the WHERE clause, group the results by region using the GROUP BY clause, and then order the results by total_revenue in descending order using the ORDER BY clause. In this process, the AI/ML model uses the logical objects specified by the data model 855, such as a table "sales," a metric "revenue," an attribute "region," and so on, so that the SQL statement appropriately maps terms from the prompt 870 to the corresponding logical objects and/or data set components (e.g., tables, columns, etc.).

In stage (D), the computer system 110 uses the received SQL statement 874 to instruct the database system 820 to obtain (e.g., retrieve, calculate, generate, etc.) the data needed to answer the user prompt 870. For example, the computer system 110 may send a request that includes the SQL statement 874 to the database system 820, in order to request the needed data. In some implementations, the computer system 110 may apply a set of rules or validation checks to verify that the SQL statement 874 is valid and appropriate to be executed by the database system 820. For example, the computer system 110 can store rules or heuristics 852 that can evaluate the SQL statement 874 element by element and/or as a whole to verify and correct the SQL statement 874 if needed before they are sent to the database system 820. In some implementations, the computer system 110 uses the rules or heuristics 852 to convert or transform the SQL statement 874 from one format or type to another.

When interacting with the AI/ML service provider 830 and/or the database system 820, the computer system 110 can apply the customized settings and properties that an administrator specified. For example, the administrator can limit which portions of the data set 822a can be accessed, and so the computer system 110 can apply those limits so that the request 872 to the AI/ML service provider 830 does not reference omitted data (e.g., excluding from the description of the data set 822a columns or tables that are not to be referenced, so the AI/ML models 140 cannot use them or even determine that they exist). Similarly the request 872 can include instructions to specifically exclude or avoid using certain data. In addition, or as an alternative, the computer system 110 can filter, edit, or otherwise check the SQL statement 874 so that the operations specified do not draw from or become calculated based on excluded data. In addition, or as an alternative, the computer system 110 can analyze the results 876 to verify that the results 876 do not include or are not based on the excluded data.

As another example, the computer system 110 and/or the database system 120 can apply access control policies or custom behavior based on the identity or role of the user 805c issuing the prompt 870. Those custom behaviors can be reflected in the interactions of the computer system 110 to the AI/ML service provider 830, such as in the request 872, as well as in the interactions with the database system 820.

In stage (E), the database system 820 generates and sends results 876 that include the data retrieved from and/or generated based on executing the SQL statement 874 to obtain data from the data set 822*a*. The database system 820 processes or executes the SQL statement 874 that it receives, which creates the results 876, which may be in any of various forms, such as records retrieved, data series, aggregations of data, statistics about data in the data set 822*a*, subsets of the data set 822*a* determined to be relevant, and so on.

In the illustrated example, the user prompt 870 asks which regions have the greatest revenue over the last year. The SQL statement 874 generated by the AI/ML models 140 specify the operations needed to generate measures of revenue by region for the previous year. The results 876 generated by the database system 820 include the values needed to answer the question in the user prompt 870. In other words, the results 876 include values of revenue for the regions specified in the data set 822*a*, appropriately labeled or associated with identifiers for those regions. In this process, the AI/ML models 140 have been leveraged to obtain the results 876, however, the AI/ML models 140 did not need or receive access to the data set 822*a* itself, and the AI/ML models 140 did not incur the resource costs of having to process the data set 822*a*. In addition, the database system 820 and its reliable, repeatable calculations ensure that the results 876 are accurate, without the AI/ML models 140 introducing uncertainty into the calculations.

In addition, the data set 822*a* may be very large, much larger than the maximum context length of an LLM used for the AI/ML model 140. In many cases, the amount of data in the data set 822*a* may be orders of magnitude larger than the maximum context size that the LLM can process. The database system 820 can process a large data set much more quickly and with greater power efficiency than an LLM can. Due to limits on LLM context sizes, it may be impractical or inefficient for an LLM to analyze the data set 822*a* to generate the results 876.

In some implementations, the computer system 110 can send a second request to the AI/ML service provider 830. The second request can include the results 876 and can request that the AI/ML models 140 generate a summary 880 or other natural language text response that answers the prompt 870 based on the results 876. For example, the second request may be a request to answer the prompt 870 using the data in the results 876 as context. As another example, the second request may be a request for the AI/ML models 140 to summarize the results 876, in addition to or instead of answering the user prompt 870. The second request can also include one or more knowledge assets that are specified in the configuration data 846, such as one or more knowledge bases 847 that the administrator 803 specified to be used by the chatbot. In addition, content of the semantic graph 850 that is determined to be relevant to the prompt can also be included.

As with the request 872, the computer system 110 can provide the user context data 856 and conversation history 857 for the user 805*c* in or with the second request, so the AI/ML model 140 can generate a response based on the context of the user's situation and the user's previous conversations, which may better explain or help disambiguate the most recent prompt 870. The computer system 110 can also provide information from the long-term memory 848 that the computer system 110 determines to be relevant, potentially as determined to be relevant specifically to the user 805*c*, the user context data 856, and/or the prompt 870.

In some implementations, the system is configured to generate visualizations as part of the response to a user prompt 870. To create these visualizations, the computer system 110 can include in the second request, or as an additional request, a request for the AI/ML models 140 to indicate an appropriate type and format of visualization for the response to the request. The AI/ML models 140 can then be used to specify the parameters for the visualization, such as the type of visualization (e.g., line chart, bar chart, line graph, geographical map, heat map, etc.), and identification of which data items are shown on different axes or dimensions of the visualization, the ranges to show, the labels to use, the color scheme, and or other properties.

If requested by the computer system 110, the AI/ML service provider 830 uses the AI/ML models 140 to generate a response to the user prompt 870, e.g., a summary 880 of the results 876 or other response requested by the second request. For example, the second request may include or provide access to the results 876 and the user prompt 870, and so the AI/ML models 140 answer the prompt 870 from the context provided by the results 876. In some implementations, this may be a summary of the results 876 and/or may include values extracted from the results 876 with added text description generated by the AI/ML models 140.

For example, in the illustrated example, the summary 880 indicates the specific regions having the greatest revenue, as requested by the prompt 870, along with an indication of the revenue values taken from the results 876, along with other description and contacts. If the user prompt 870 requests information about a visualization, or if the AI/ML models 140 determine that a visualization is likely appropriate or beneficial, then the summary 880 can include a visualization description. The visualization description can specify the properties recommended for a visualization of the results 876 as a whole, or for specific items that answer the user prompt 870.

In stage (F), the computer system 110 generates response data 882 to provide a response to the user prompt 870. This response data 882 can include the SQL statement 874 generated by the AI/ML model 140. The response data 882 can include some or all of the results 876, which can be provided as a preview of the data that would be obtained by the SQL statement 874. In addition, or as an alternative, the response data 882 can provide a summary 880 of the results 876, such as a natural language answer that answers or fulfills the request of the prompt 870 using the results 876.

In stage (G), the user device 806*c* receives the response data 882 and presents the response in the user interface 862. For example, the SQL statement 874 can be displayed to the user. In some cases, the SQL statement 874 may be initially hidden from view in the user interface 862, but can be brought into view through interaction with an icon, button, or other control in the user interface 862. The user interface 862 can also display or present the summary 880, some or all of the results 876 (e.g., as a data preview), and so on.

In some implementations, the computer system 110 and/or the user device 806*c* save the SQL statement 874 as an object for later use. For example, after an SQL statement is generated using an AI/ML model 140, an object representing this SQL statement 874 can be saved in association with the data set 822*a*, a document or project the user 805*c* is working on or has open, or a user account for the user 805*c* and so on. As a result, the computer system 110 and/or the user device 806*c* can provide a link from the chat interface to other data processing interfaces. As a result, when the user is generating a new document, or creating a visualization, or managing the data set 822*a*, an icon, button, record, or other user interface element can provide the user a chance to apply or reuse the SQL statement 874 generated through the chat interaction. For example, the user can re-run the SQL statement 874 to obtain a more up-to-date set of results. As another example, the interface can enable the user 806c to drag the icon or user interface element for the SQL statement 874 to a portion of a document to cause a visualization to be generated based on the SQL statement 874 and the results it provides. The computer system 110 can store the SQL statement 874 as an object and associate it with the user 805c and/or the data set 822a, to automatically retain and provide it in future projects. This provides a seamless option for the user to insert and use AI/ML-generated SQL statements in a wide variety of situations, with the computer system 110 providing the previously-generated SQL statements automatically in those other interfaces.

In some implementations, the computer system 110 can provide the SQL statement 874 to the AI/ML service provider 130 with a request for the AI/ML model 140 to provide a description of or a summary statement describing the data processing criteria represented in the SQL statement 874. The computer system 110 can ask the AI/ML model 140 to translate a SQL statement that the AI/ML model 140 itself generated back into a natural language statement that expresses the type of result data that the SQL statement would generate. Thus, the system can use the AI/ML model 140 to interpret the user prompt 870 and convert it to a SQL statement 874, and then use the AI/ML model 140 to interpret the SQL statement 874 and convert it to a natural language statement. This two-step process, converting from natural language to SQL then back to natural language, provides an effective way to obtain the interpretation applied by the AI/ML model 114, so it can provide transparency about how the response content is generated.

By using the AI/ML model to produce SQL content, the system obtains clear insight into the interpretation of the AI/ML model of the natural language content of the user's prompt. In addition, by requesting a response with a structured or standardized format, such as SQL content, the interpretations of the chatbot are well-defined and have much less ambiguity than a natural language chatbot response would often provide. When making the request to the AI/ML model, the system can provide the chatbot a data model or data schema for the data source(s) from which to retrieve data. The resulting code or instructions can thus reference specific data objects (e.g., particular logical data objects such as metrics, attributes, facts, etc., which may correspond to data sets, data tables, columns, rows, fields, etc. included in or derived from an underlying data set) with particularity, which can often show a distinct mapping or correspondence to a discrete portion of a data set. In addition, with the SQL statement generated by the AI/ML model, the system can retrieve and calculate values that are often much more accurate than if the AI/ML model 140 attempted to provide the values directly, even if the AI/ML model 140 had the data set 822a as input.

When a visualization is requested by the prompt 870 or suggested by the AI/ML models 140, the computer system 110 uses the visualization description from the AI/ML models 140 to generate the actual visualization content. In this manner, the visualization that is provided is based on reliable, accurate data or calculations in the results 876 and/or the data set 822a. For example, the visualization that is rendered has the type of data specified by the AI/ML model 140, and in the arrangement specified by the AI/ML models 140, but with values or data series shown being determined through data retrieval and/or calculations of the database system 820 to ensure accuracy and reliability.

In some implementations, the computer system 110 enables an administrator to attach one or more additional sources of data, such as the knowledge bases 847, to adjust the interpretations made by the AI/ML model 140. For example, an additional data set can be a knowledge base 847 or data dictionary can be added. AI/ML models are generally not configured to answer questions about the additional data set or to retrieve metrics or to provide visualizations of the knowledge base 847. Instead, the knowledge base 847 can be provided to assist an AI/ML model 140 in interpreting user queries and providing responses with the terminology for the user's organization. In general, the knowledge base can function to provide contextual knowledge to the AI/ML models 140, so the models can classify and use the nomenclature of the end user when generating answers to user prompts.

Many different organizations or departments use terms that have a special contextual meaning, or are not part of general language, and so would not be available for training of an LLM. For example, a company may internally use various names for its products, projects, teams, locations, policies, initiatives, organizational structure, and so on. For example, a company be developing a product with a codename of "starfish" that being developed by a group of employees called "red team." The training state of an LLM would not incorporate information about these entities, which are specific to the company and not referenced in public documents. To enable the chatbot to process questions about these internal entities and provide answers that reference them, a knowledge base is designated for the chatbot to describe these and other internal terms. Each time the user submits a prompt, the knowledge base can be provided to assist the LLM with the context that is appropriate for the company. The knowledge base can provide information similar to a semantic graph, by describing entities and their relationships. In some cases, the information in the knowledge base can be derived from a semantic graph 150 and then converted into text (e.g., unstructured, semi-structured, or structured) in a format that can be processed by the LLM.

In general, the knowledge base or other additional data set can include data that maps terms or phrases to their meanings. In many cases, this can include semi-structured data or explanatory content, as a way to explain entities and relationships wo the AI/ML models. Although the knowledge base may include definitions, more generally the information may include descriptions of people, roles, business units, products, and other terms that may be referenced. The administrator may upload one or more of additional data sets and specify which additional data sets, if any, should be used to provide context for a AI/ML model 140. The data sets selected for this contextual function can then be used to provide context for responding to many or even all prompts for an organization.

In some implementations, the contextual data sets or knowledge bases 847 can be applied so that they apply to multiple chatbots or AI/ML models 140. For example, an enterprise can designate one or more knowledge bases 847 as contextual data sets that can be applied consistently across the enterprise, for all chatbots created and used in the enterprise. Similarly, different departments within the enterprise may add their own particular contextual data sets that may supplement the enterprise-wide knowledge bases 847. In addition, specific contextual data sets can be added for specific users, user groups, or circumstances (e.g., particular data sets 822a-822n, software applications, user interfaces, etc.). In this way, different interfaces or different levels of an organization can inherit a consistent set of terminology and knowledge in an organization, which also makes maintaining the overall knowledge base much more simple. The knowledge bases 847 can additionally or alternatively be specified with a scope that corresponds to a computing environment, so that interfaces associated with a particular domain or server inherit the knowledge bases for that domain or server.

One of the advantages of the knowledge base 847 is consistency for many users and even for many different interfaces or AI/ML models 140. The user submitting a prompt does not need to take any action to select or include the knowledge base 847 in the AI/ML model 140's processing, the AI/ML model 140 automatically include the knowledge base 847 in its context for each prompt or question received. Also, because the knowledge base 847 can be shared or inherited by many interfaces or applications within an organization, updating and maintaining the knowledge base 847 is simple. An edit to the knowledge base 847 is automatically applied to all of the chatbots associated with the organization, even if the chatbots were created by different administrators or provided to different sets of users.

In addition, the knowledge base 847 provides persistent context that is not lost from one prompt to another or from one session to another. The knowledge base content can also be implemented applied in a manner that the knowledge base 847 does not count toward the instruction token limits that the AI/ML models 140 consume for each response. Rather than counting toward the tokens for prompts and recent history, the knowledge base 847 can be accessed or provided to the AI/ML models 140 as a separate source of knowledge apart from the prompt and context, and so does not count toward the token limits of an LLM. Implementations of access to the knowledge base 847 can vary. For example, when a session with the AI/ML model 140 is instantiated, the knowledge base can be provided as part of initializing the session with the AI/ML model 140. In some cases, the AI/ML models 140 are additionally or alternatively configured to access the primary data set and if the user prompt includes a term or makes a request for an item not specified in the primary data set, the chatbot is configured for the AI/ML models 140 to then check the knowledge base or other contextual data sets. In some implementations, the knowledge base 847 can be prepared as an embedding, a vector database, or other format that can be accessed by or referred to by the AI/ML models 140.

In some implementations, the chatbot is designed to have a long-term memory 848, which can store information learned from users in past interactions. For example, LLMs and other AI/ML models 140, on their own, are generally stateless and do not natively understand the user context or history of interactions with the user, especially from previous sessions. The computer system 110 can facilitate learning by the chatbot to provide infrastructure that creates a long-term memory 848 for the chatbot. For example, the long-term memory 848 can store items such as definitions of terms for a particular user context, unique text elements the chatbot might encounter, and feedback from prior user interactions.

In some implementations, the computer system 110 can store and use a personal knowledge base for individual users. For example, in addition to or instead of a knowledge base 847 that is used for many users and collects definitions and information across an organization, a personalized knowledge base with a particular user's 805c commonly used terms and information is stored and provided to the AI/ML model 140. The computer system 110 can build this personalized knowledge base over time, through interactions with the user. For example, if the system 110 provides generated SQL statements and the user 805c edits the statements, the computer system 110 can note the change (e.g., such as to change from one attribute reference to a different attribute reference), as well as the prompt or other contextual factors that are applicable in the personalized knowledge base. Similarly, if the user 805c indicates through chat interactions or ratings of answers (e.g., thumbs up or thumbs down, or text descriptions of errors identified in SQL output or natural language responses), the computer system 110 can similarly store these in the personalized knowledge base.

In many cases, the same statement may have multiple possible interpretations, and different users would prefer different interpretations. For example, a user may ask in a chatbot interface, "what are the 5 best comedies of 2023?" The criteria or standard to judge what is "best" is ambiguous, and could refer to box office sales, a rating by consumers, a rating by movie critics, ratings by any of various different websites, and so on. If the system provides a result that the "Three most highly-rated movies according to Website 1 are . . . " If the user accepts this answer, then the computer system 110 can add an entry in the personalized knowledge base that, for the current data set 822a-822n being used, then the term "best" or "best" in the context of the topic of movies means "Score from Website 1." When the system learns this, the system can inform the user and give the user the chance to confirm or cancel the information inferred. For example, the system can provide a statement "I just learned that best movie=highest Website 1 Score," along with controls for the user to confirm or cancel. Thus, over time, the system can learn and tailor its interactions to individual users. This person by person learning can be very important, because different people trust different sources and also have different personal criteria for making decisions.

In some implementations, a computer system uses machine learning models to generate interactive documents, such as dashboards, reports, dossiers, and other types of documents that can provide visualizations and dashboards for private databases. The system can be configured to receive a result data set from SQL query processing, along with contextual information, and generate an interactive report, dashboard, or other document with layout, formatting, and content selected based on the machine learning model output.

Figure 9:
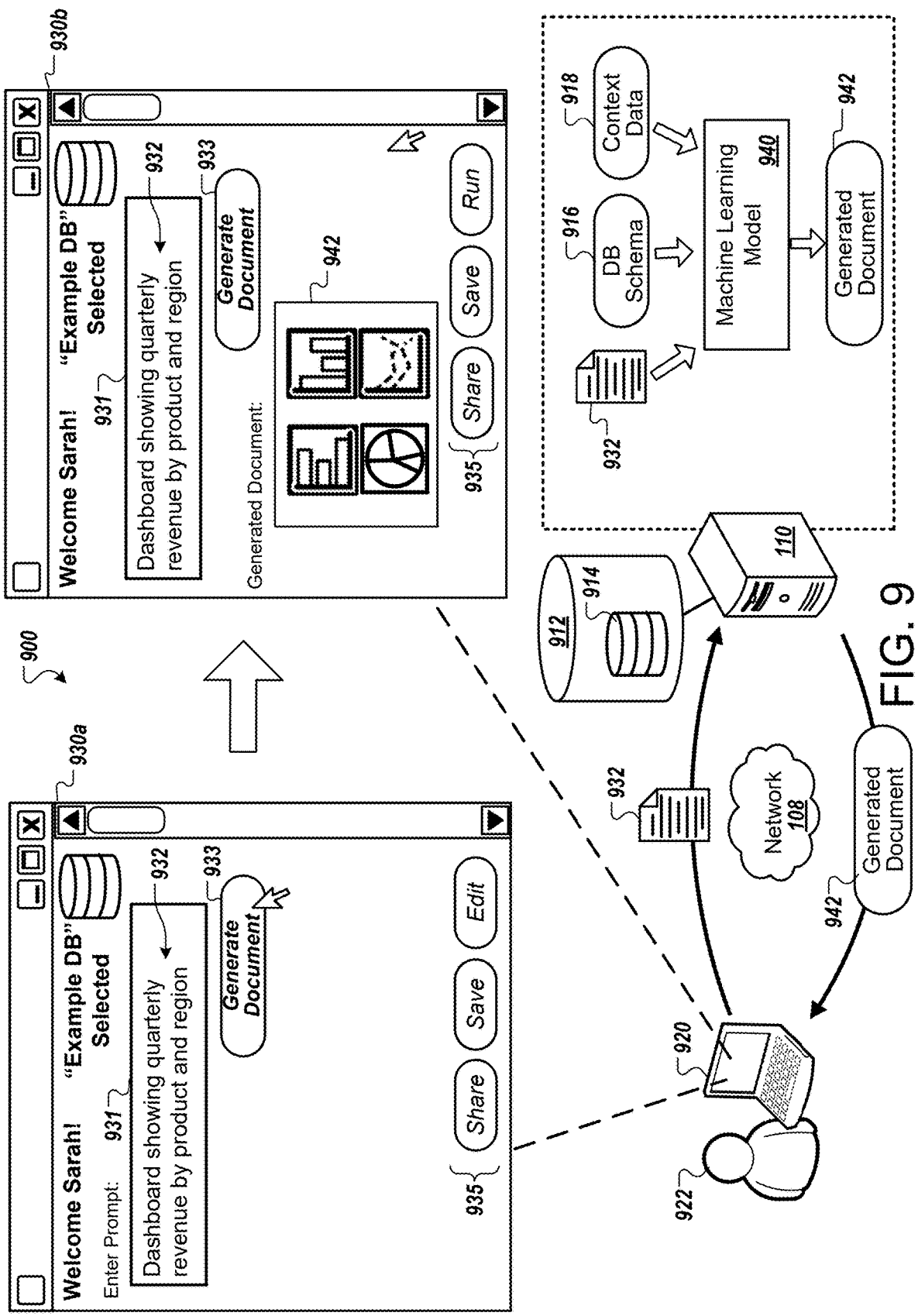
FIG. 9 is a diagram showing an example of a system for using artificial intelligence or machine learning to generate interactive documents.

FIG. 9 shows an example of a system 900 that can use machine learning or artificial intelligence to enhance user interaction with a database system. The system 900 includes a computer system 110 that accesses data storage 912. The computer system 110 receives data from and provides data to user devices over a network 908. For example, the user device 920 can receive interface data over the network 908 and can provide requests to the computer system 110 over the network 908. The network 908 can include public and/or private networks, such as the Internet, a wide area network, a local area network, a cellular network, and so on.

In the example of FIG. 9, the user device 920 initially presents a user interface 930a to access various features of the system. The user interface 930a shows that the user, Sarah, has logged in and is working with a data source titled "Example DB." The user interface 930a provides a text input field 931 in which the user 922 can enter a prompt or natural language statement representing the type of interactive document to be generated. For example, the user 922 enters text 932 "dashboard showing quarterly revenue by product and region." The user then clicks a button 933 indicating that the system should generate an interactive document based on the entered text.

In response to the user request, the user device 920 sends the entered text 932 to the computer system 110 over the network 908. The computer system 110 uses information about the user 922, the context of the interface 930a in which the text 932 is entered, and characteristics of the data source (e.g., Example DB) to generate an interactive document using a AI/ML model 940. The AI/ML model 940 can include a large language model (LLM) that has been trained on a large number of text examples. The AI/ML model 940 has been further trained with examples of interactive documents and corresponding data, such as text descriptions, natural language requests, database schema information, object models, application context, data, and so on. As a result, the AI/ML model 940 has been trained to identify, from the inputs it receives, likely document content and interactive elements, including relevant portions of data sources, that would be used in different situations. In addition, the AI/ML model 940 can have a training state that represents characteristics of interactive documents, such as layout, formatting, visualization types (e.g., the charts or graphs used in different situations or for different types of data), color schemes, fonts, element sizing, document length, and so on. The AI/ML model 940 has also learned to provide document content, such as visualizations, interactive elements (e.g., filter controls, sharing controls, controls for sorting or searching through data, etc.), and connections with underlying data sources (e.g., which tables, columns, attributes, metrics, data ranges, etc. would be relevant to a user-submitted prompt, and which visualizations or operations should be based on them).

In some implementations, the AI/ML model 940 is run in a cloud computing environment, potentially hosted and offered as a service by a third party. In other implementations, the AI/ML model 940 may be stored and run locally. In many cases, the computer system 110 itself may be implemented using distributed computing platforms or cloud computing platforms.

For example, the AI/ML model 940 receives the text 932 that the user 922 entered. The AI/ML model 940 also receives at least a portion of the database schema 916 for the current data source, "Example DB." The machine learning model also receives context data 918, which can include information identifying the user 922, information about features or keywords present in the user interface 930a when the request was made, files or visualizations that are currently or were recently retrieved or presented for the user 922, and so on.

Based on the inputs, the AI/ML model 940 generates an interactive document 942. The computer system 110 provides the generated interactive document 942 to the user device 920 over the network 908. The user device 920 then displays the user interface 930b, in which a preview or full view of the generated interactive document 942 is displayed for the user 922 to view and edit. For example, the user interface 930b can present the generated interactive document 942 and also allow the user 922 to click and edit the interactive document if desired. The user interface 930b also includes interactive controls 935, such as buttons to cause the computer system 110 to save the generated interactive document, load or run the generated interactive document, or perform other operations.

The functionality of the system 110 and the model 940 to generate interactive documents can be accessed through many different interfaces or functions. For example, the interfaces 930a-930b can be provided through a web application, web page, native application, or other interface. As another example, the document generation functionality can be accessed through a chat interface when the user requests generation of a document. As another example, the document generation functionality can be linked to other modules or functions of the system 110, such as to receive a result set provided in response to a natural language query or SQL query.

For example, rather than the user 922 explicitly requesting a document to be generated, the user 922 may enter a natural language query requesting information, such as "how do this quarter's sales compare to last quarter's?" In response, the system 110 can generate a SQL statement that would retrieve the sales data for the current quarter and previous quarter. The SQL statement itself may be generated by a machine learning model trained for this functionality, or may be generated by a programmed module of the system 110. The system 110 then processes the SQL statement to generate a result dataset (e.g., a set of records responsive to the query). The result dataset (and/or statistics about or characteristics of the result dataset) can be provided as input to the AI/ML model 940 to prompt a new document to be generated. Other data can be provided to the AI/ML model 940 assist document generation, such as data identifying or characterizing the user, the user's role, data source, user question or the query used to generate the result data set, and so on. In response, the AI/ML model 940 can generate a document that has features that the model predicts are most likely to be appropriate given the input set. This can include a dashboard-like interface that includes visualizations of the data in the result dataset.

Figure 10:
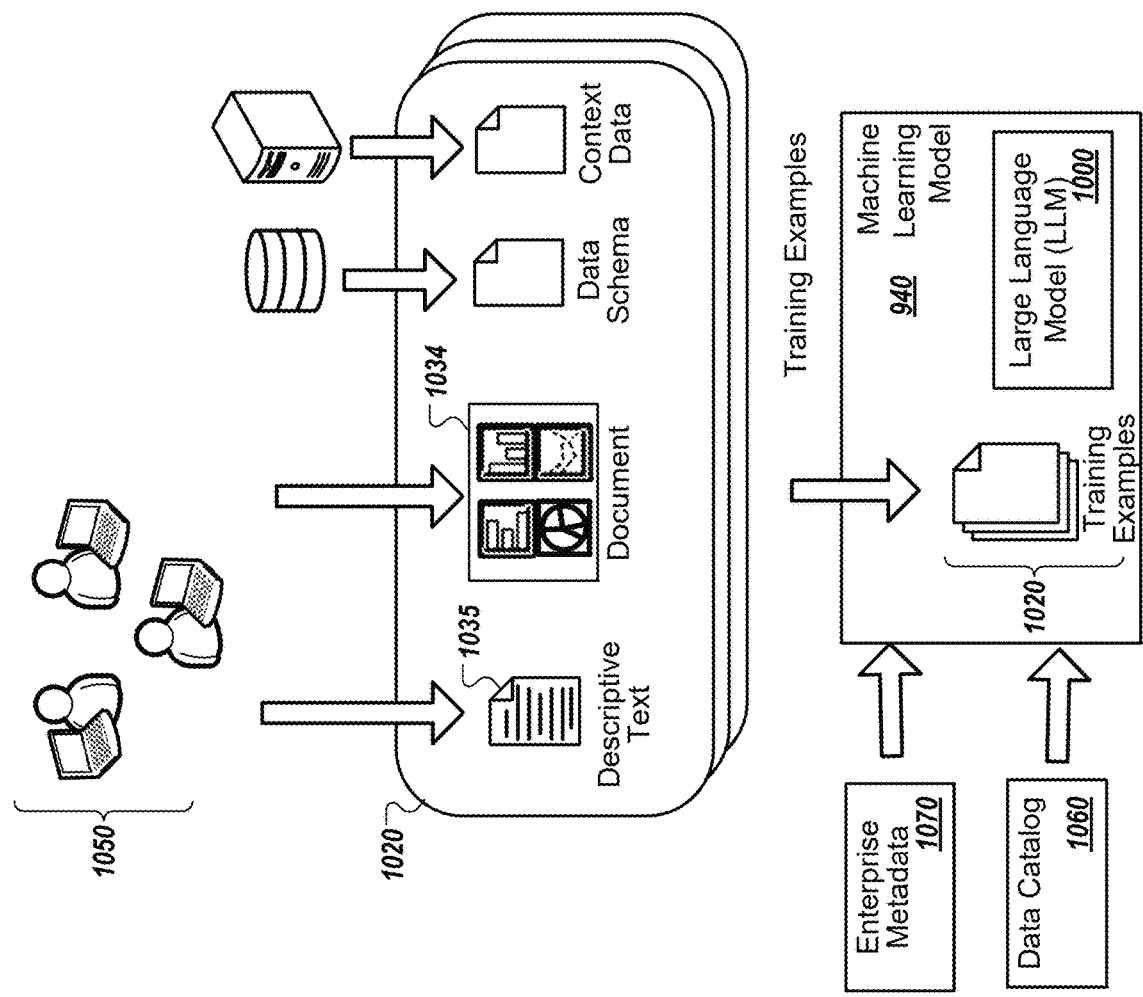
FIG. 10 is a diagram showing an example of a machine learning model and training data used to train or fine-tune the model.

FIG. 10 shows additional details about the AI/ML model 940 and data that can be used to generate or improve the AI/ML model 940. The AI/ML model 940 can include a large language model 1000. This LLM 1000 can be pre-trained by a third party to capture statistical information about many different words, phrases, and even computer code segments. As a result, the LLM 1000 can capture relationships present in one or more natural language is such as English, Spanish, Italian, and so on. In some implementations, the LLM 1000 may also have been trained at least in part using computer code segments from one or more programming languages or scripting languages. For example, the LLM 1000 can be trained using examples of documents with content in HTML, XML, JSON, Javascript, scripting languages, or other formats.

In the example, the machine learning model includes, in addition to the LLM 1000, various training examples 1020, which provide additional context specific to the document generation task and/or other tasks for which the model 940 is developed. For example, while the large language model 1000 may be trained on millions and millions of different texts and examples, a smaller number of training examples 1020, such as hundreds or thousands of training examples 1020, maybe provided to fine-tune the operation of the LLM 1000 for a specific types of documents or data sets. In this example, training examples each include an interactive document 1034 (e.g., a dashboard, report, dossier, etc.). Examples can also include corresponding text 1035, such as a user's statement that describes their document 1034, or a user question or a query that was used to generate the set of data represented or visualized in the document 1034. In some cases, the text 1034 can be keywords, user labels or tags, topic identifiers, or metadata extracted from the document 1034 or a data source from which information in the document 1034 is derived. As another example, the text 1035 can be a summary or description generated by other users or administrators reviewing the document 1034 and providing a summary, description, or label for the document 1034. The training examples can include additional information as well, such as data schema information for the data source(s) from which content of the document 1034 was derived. Another example includes context data, such as information about the role, department, or background of a user that created the document.

To enable the model 940 to generate documents based on search results or SQL query results, training examples can include query result datasets (potentially along with the initial user question or query used to identify the results) and documents generated based on those results (e.g., dashboards, reports, dossiers, slide presentations, document templates, visualizations, or other documents that a user generated or selected to present the result dataset). As a result, the model 940 can learn the relationships between different types of data and different combinations of data types and the resulting document characteristics that occur. For example, result datasets that include addresses and other geographical data may be often associated with dashboards that show geographical maps, and the model 940 can learn to include map visualizations when geographical data is present. Similarly, the model 940 can learn aggregation levels, such as geographic region sizes (e.g., country, county, city, etc.), time scales (e.g., year, quarter, month, etc.), and other aggregation levels that are most commonly used with different data types, user questions, result characteristics, and so on.

Over time, the AI/ML model 940 can be trained using the user input or user feedback that is provided through use of the system. For example, in the example of FIG. 9, if the user 122 edits the generated interactive document 142 when shown in the interface 130b, the edits and resulting edited interactive document can be recorded and used to further train the AI/ML model 940. As a result, as users continue to use the features the model 940 supports, their positive and negative feedback can reinforce positive characteristics of generated results and inhibit errors or undesirable characteristics of generated results.

Training examples 1020 can be stored in or with the AI/ML model 940, to provide a context and data set from which the LLM 1000 can draw to generate interactive documents for new user inputs. In some implementations, the context provided by the training examples 1020 represents a wrapper or additional component of the AI/ML model 940. In other implementations, the LLM 1000 can be further trained or refined using the training examples 1020, to result in a modified LLM 1000 that incorporates the information from the training examples 1020. In some implementations, the AI/ML model 940 can be updated or informed by information that is specific for a user, group of users, or organization. For example, a particular company or department within a company may have a particular data catalog 1060 or repository of metadata 1070 that indicates commonly used terminology and object definitions. Having this information for the AI/ML model 940 to learn from or to reference during generation can greatly improve the versatility of the AI/ML model 940 to handle the wide range of user requests that may be provided. And some implementations a semantic graph or similar data for an enterprise can be used for the same purpose. As a result, if a user submits a request that includes a reference to "SKU" but the training examples 1020 and the current data schema do not reference this term, the AI/ML model 940 may nevertheless use instances of that term and it's mapping to other terms such as product identifier or product code to map the term to an appropriate portion of the data set that is relevant.

In the training examples 1020, documents of different types can be provided, e.g., dashboards, reports, information cards, dossiers, etc., and the model 940 can learn to generate each of the different types and to determine which types are associated with corresponding keywords, query result data characteristics, and/or data sources. The generated documents provided by the model 940 can be provided using computer code or scripting language content. For example, the example documents 1034 may be expressed HTML, XML, JSON, Javascript, Python, or another form of code or scripting language. The resulting generated documents from the model 940 can be written in the same types of code or scripting language.

The generated documents can include various interactive features, such as controls that are selectable by a user to edit, save, share, filter, sort, update visualization content or formatting, etc. The generated documents can also include connections to live data sources, so the generated documents, when loaded, retrieve data from and show visualizations representing data that is refreshed or sourced from the data sources, rather than simply showing hard-coded or static data. For example, the generated documents can include references or links to private databases or other data sources (e.g., data cubes, tables, data warehouses, etc.). In particular, the references and reliance on live data sources can be made from the data source or data set indicated to the model 940 when document generation is requested, with the types of references used and the data manipulations performed being learned from the examples in the training examples 1020. The generated documents can have many types of properties or characteristics learned from the training data, including layout, formatting, visualization types (e.g., chart or graph types), element sizing, coloring, order or sequence of elements, headings placement and content, and so on.

Figure 11:
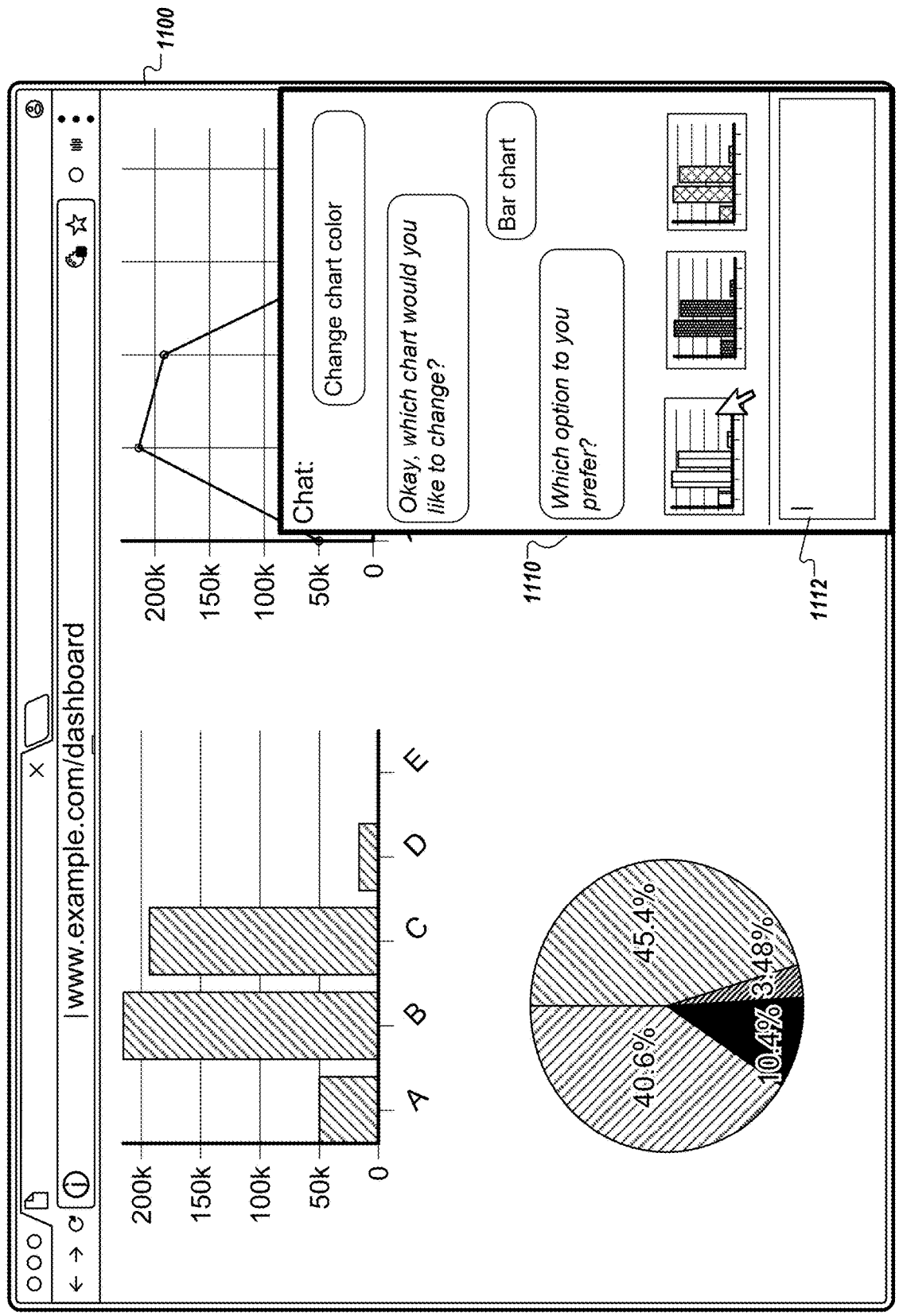
FIG. 11 is a diagram showing an example of an interactive document and a chat interface that enables changes and updates to the interactive document.

FIG. 11 shows an example of how the artificial intelligence and/or machine learning features can be accessed through a chat-style interface. The example shows a user interface 1100, which shows a dashboard or other document. The chat interface 1110 includes a text field 1112 in which a user can make requests and ask questions about the current document and the underlying data source that is represented in the visualizations, tables and other data shown.

In the example, the user has made a request to "change chart color." The system, with interactions generated using the AI/ML model 940 or another model, generates a response asking which chart the user would like change. The user replies that the bar chart is the one to change. In response, the system uses the model 940 to generate different options that can carry out a type of change as requested by the user. For example, three different modified versions of the bar chart are shown with a question posed to the user of which option is preferred. The user can click one of the options to cause the system to update the main document with the formatting or other characteristics of the generated option selected. If the user does not prefer one of the three options shown, the user can continue interacting with the chatbot to make further requests or changes.

Figure 12:
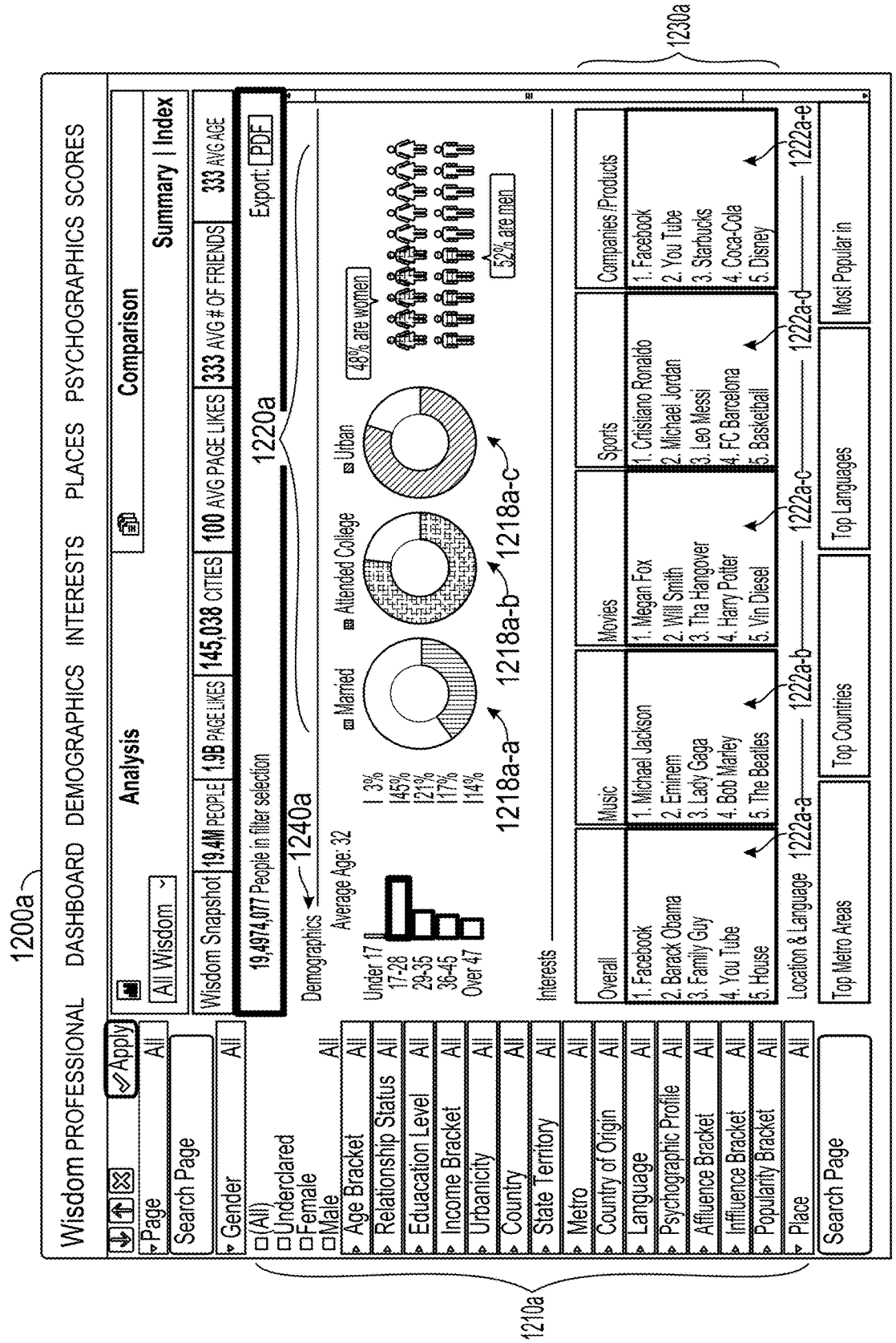
FIGS. 12 and 13 illustrate example interactive documents.
Figure 13:
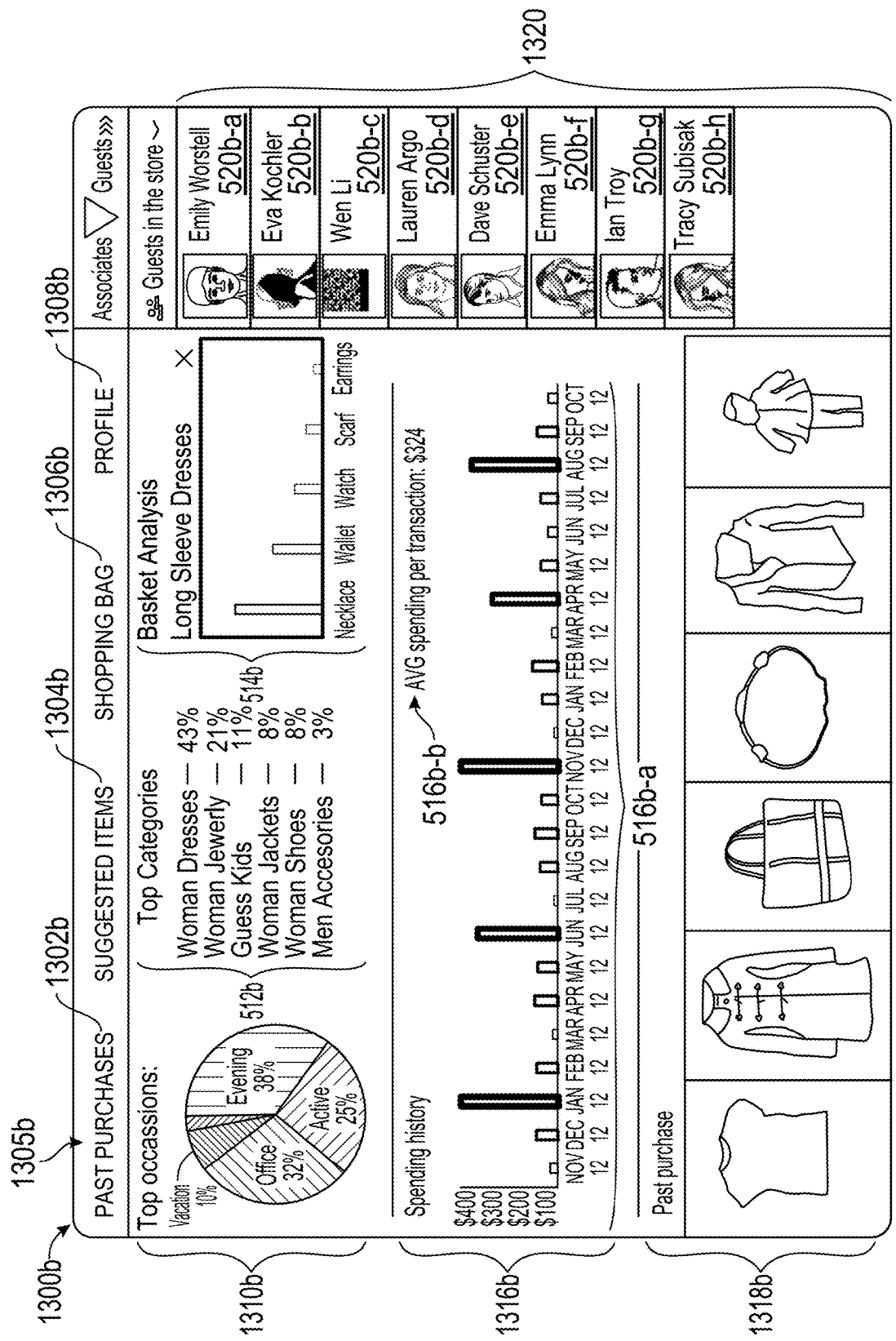

FIGS. 12 and 13 illustrate example dashboards, which are example documents or interfaces that can be generated using machine learning models as discussed herein. In some implementations, the machine learning models generate complex documents of multiple pages or sections, such as a collection of multiple dashboards, reports, or other components.

FIG. 12 illustrates an example user interface 1200a of a dashboard interface. As shown, interface 1200a comprises a plurality of control objects 1210a-1240a. For example, control objects include grids (e.g., data displayed in table format), graphs, text fields, shapes, etc. that users can use to navigate through the data presented through interface 1200a. Interface 1200a can be powered by an in-memory analytic data store, such as an OLAP data cube, or another type of data source (e.g., data warehouse, database, etc.). In this regard, in some implementations, the analytic data store powers an extensive market intelligence network that provides the data shown in user interface 1200a. For example, computer systems implementing the techniques described herein uses information about an application and/or design aspects of dashboard 1200a to generate queries to the in-memory data store.

For example, all of the market intelligence data used by and displayed through the intelligence dashboard interface 1200a can be loaded into the in-memory analytic data store. In this example, user interface 1200a receives user input defining filter criteria 1210a related to the market intelligence information a user seeks. Filter criteria 1210a can include demographics data or any other type of data as shown in interface 1200a or otherwise available to filter the market intelligence data stored in the in-memory analytic data store. For example, the user may be able to filter the data by gender, age, relationship status, education level, income bracket, urbanicity, etc. A query execution engine can receive the user input defining filter criteria 1210a, and execute queries to access the market intelligence data stored in an in-memory analytic data store. In some examples, the query execution engine can receive the accessed data, perform analytics on the accessed data, and output the results of the analytics to user interface 1200a.

As shown in FIG. 12, the user interface 1200a specifies the demographic data used to generate the dashboard output broken down into various categories 1220a (e.g., as shown in charts 1218a-a, 1218a-b, and 1218a-c) and outputs ranked lists of interests 1222a-a to 1222a-e for people that fall within the demographic profile 1240a defined by the filter criteria 1210a. For example, the categories 1220a can include what percentage of the relevant population is married, has attended college, or lives in an urban area. Other types of output and data visualization can be used. In addition, the user interface 1200a can receive additional user input to refine or change the filter criteria 1210a or the results sought and the user interface 1200a can dynamically update in short order given the in-memory data retrieval and processing that occurs responsive to the additional user input.

By way of example, FIG. 13 shows a user interface 1300b of an intelligence dashboard also powered by an analytical in-memory data store. Interface 1300b displays a customer report 1305b to, e.g., a sales associate in a retail store. In an example, the sales associate can view the customer report 1305b on a store computer.

In some examples, graphical user interface 1300b includes customer portion 1320b that displays information indicative of customers who are, e.g., in a particular geographic location (say, the retail store). Customer portion 1320b displays customer information 1320b-a to 1320b-h, with each item of customer information 1320b-a to 1320b-h representing a customer. A user can select customer information 1320b-a to 1320b-h by, for example, using a mouse to click on, or using a touch screen display to touch, a desired item of customer information 1320b-a to 1320b-h. When an item of customer information 1320b-a to 1320b-h is selected, interface 1300 displays information pertaining to the selected customer. In the interface 1300, a viewer of graphical user interface 1300, e.g., the sales associate, has opted to view information associated with the customer represented by customer information 1320a.

A query execution engine can receive the user input, e.g., selection of customer information 1320b-a to 1320b-h, and execute queries to access the market intelligence data stored in an in-memory analytic data store. In some examples, the query execution engine can receive the accessed data (e.g., data from the in-memory analytic data that complies with the filter criteria 1210a), perform analytics on the accessed data, and output the results of the analytics to user interface 1300b.

As shown, interface 1300b includes past purchases link 1302b, selection of which causes interface 1300b to display information indicative of past purchases of the customer that is selected via customer portion 1320b. Interface 1300b also includes suggested items link, selection of which causes interface 1300b to display suggestions information 1304b indicative of suggested items that a particular customer (e.g., the customer selected from customer portion 1320b) may be interested in and want to purchase. Suggestions information 1304b can based on analyzing data that is retrieved from an in-memory analytic data store. For example, suggestions information 1304b can be based on customers' past purchases. Interface 1300b includes shopping bag link 1306b, selection of which causes graphical user interface 1300b to display items that a particular customer wishes to purchase. Interface 1300b includes profile link 1308b, selection of which causes interface 1300b to be updated to display a customer profile of a particular customer (e.g., the customer selected via currently present customer portion 1320b).

Interface 1300b includes top occasions portion 1310b that displays information (e.g., a graph) indicative of the top occasions for which a particular customer (e.g., customer 1320b-a) has purchased merchandise. Information for top occasions portion 1310b can be generated based on analytics performed on market intelligence data contained in an in-memory data store. In this example, top occasions portion 1310b is generated by tracking past purchases of the customer and then categorizing the types of purchase (e.g., based on various occasions). In another example, top occasions portion 1310b displays information indicative of the top occasions for a group of customers, e.g., rather than displaying the top occasions for a particular customer.

Interface 1300b also displays top categories information 1312b, e.g., information specifying top categories of goods that have been purchased by a particular customer and/or by a group of customers at a retail store. Information for top categories portion 1310b can be generated based on analytics performed on market intelligence data pertaining to the particular customer and/or the group of customers contained in an in-memory data store. In some implementations, interface 1300b can include basket analysis portion 1314b— for display of information indicative of types of goods that are currently in an electronic shopping cart of a customer.

Graphical user interface 1300b also includes spending history portion 1316b to display information indicative of how much money a particular customer (e.g., the customer selected in portion 1320b) has spent with the retailer over a period of time. Information for spending history portion 1316b can be generated based on analytics performed on market intelligence data pertaining to the particular customer contained in an in-memory data store. Spending history portion 1316*b* can include a timeline 1316*b*-*a*, e.g., a representation of the period of time over which spending is tracked. Spending history portion 1316*b* also includes information 1316*b*-*b* that specifies an average amount of money a particular customer has spent with the retailer over a period of time. Interface 1300*b* also includes portion 1318*b* for display of information indicative of past purchases and/or transactions of a particular customer.

One of the types of documents that can be generated using a machine learning model is a dossier, which can be a document that includes a defined collection of documents or interfaces. The dossier can include a grouping of interfaces, such as documents, dashboards, reports, or other objects. These objects can be presented with a specified layout, formatting, or sequence as indicated by the model that generates the dossier. These interfaces can include interactive elements, such as filters and other controls (e.g., buttons, sliders, check boxes, and other elements that trigger actions in the document or change the content or view of the document). The model that generates a dossier can generate the interactive elements and specify the operations performed in response, as well as specify the links to data sources that the operations will operate on. A dossier can often be viewed and interacted with similar to an application.

A dossier can include data connecting the elements (e.g., tables, charts, graphs, text areas, maps, buttons, etc.) to live data sources. For example, a dossier may include data connecting a chart, table, or map shown in a dashboard of the dossier to a data set provided by a database server. The chart, table, or map can be updated so that users can be shown the current information from the database each time they view the dossier. Of course, a dossier may include or reference a static data set, and filters or other controls may operate on the static data set. Similarly, pre-generated content elements that do not change can also be presented.

Dossiers can have a variety of characteristics. In some implementations, a dossier defines a closed set of elements or data sources. For example, a recipient of a dossier may be able to filter or manipulate data from data set that the creating user specified, but the recipient may be restricted from adding new data sources to the dossier. Sharing a dossier may grant the recipient access to a data source for viewing and use within the dossier.

A dossier can be structured as a hierarchy or tree of objects. For example, a dossier can have a content root node which is associated an identifier, which will be referred to as a dossier identifier. Interfaces may be defined for the dossier as, for example, chapters and pages within chapters. The content root node may include information indicating each of the document elements at the next level of the hierarchy, e.g., different chapters. In some implementations, the content root node may include data indicating the structure of the entire tree.

Different levels of the hierarchy may each link to different elements of the dossier. Examples include a (i) "page node", (ii) a "filters panel stack," and a (iii) "section node." The cover page may provide an initial view or overview of a given level of the hierarchy, e.g., for the dossier as a whole or a more specific section. The "filters panel stack" represents interactive elements and their settings. Each level of the hierarchy may have associated interactive controls. Some controls, linked to the root node, may act on the entire dossier, for example, to filter a data source across all chapters and pages. These filters may be considered more of a global filter as they filter across all chapters and pages.

Other controls may operate in more limited areas of the dossier, for example, on specific chapters, pages, regions of pages, or specific elements within pages. These filters may be considered local filters as the filter operates on specific elements. Thus, the behavior of controls can be defined independently for each level of the hierarchy that forms the dossier. The page node may represent a specific view or user interface. The position of page nodes in the hierarchy indicates the sequence that views are shown to the user.

In some implementations, elements of the dossier are stored as server objects, for example represented by XML code or other data structures. Each object has a unique identifier, so that the structure of the dossier can be defined by links between the objects. The overall structure of the dossier may be fixed by the user that creates the dossier. Each user that receives the dossier may have a user identifier assigned.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

The invention claimed is:

1. A method performed by one or more computers, the method comprising:
   providing, by the one or more computers, an interface configured to receive input comprising data processing criteria expressed in natural language text;
   receiving, by the one or more computers, natural language input through the interface, wherein the natural language input specifies one or more criteria for retrieving or generating data from a data set;
   determining that the data set is relevant to the natural language input; and
   based on determining that the data set is relevant to the natural language input, selecting a data model for the data set;
   obtaining, by the one or more computers, a structured query language (SQL) statement generated by an artificial intelligence or machine learning (AI/ML) model based on the natural language input, wherein obtaining the SQL statement comprises causing the AI/ML model to process the natural language input using the selected data model as context, and wherein the SQL statement expresses the one or more criteria from the natural language input using references to components of the data set or logical objects of the data set; and
   providing, by the one or more computers, the SQL statement through the interface.

2. The method of claim 1, wherein the AI/ML model is a large language model.

3. The method of claim 2, wherein the large language model has been trained based on examples of computer-generated SQL statements and corresponding user-edited SQL statements made by editing the computer-generated SQL statements.

4. The method of claim 1, wherein obtaining the SQL statement comprises:
sending a request for the AI/ML model to generate the SQL statement, wherein the request includes:
the natural language input or a natural language instruction the AI/ML model that is generated based on the natural language input; and
data indicating contents or structure of the data set; and
receiving the SQL statement that the AI/ML model generated, in which elements of the natural language input are mapped to or translated to components of the data set.

5. The method of claim 4, wherein the data indicating the contents or structure of the data set comprises an object model or database schema for the data set.

6. The method of claim 1, wherein obtaining the SQL statement comprises generating an instruction to a large language model based on the natural language text.

7. The method of claim 1, wherein determining that the data set is relevant to the natural language input comprises:
comparing terms of the natural language input to data models for data sets or metadata for data sets; and
determining that the data set is relevant to the natural language input based on a match or similarity of the terms of the natural language input and the data model for the data sets or the metadata for the data set.

8. The method of claim 1, wherein determining that the data set is relevant to the natural language input comprises:
receiving data indicating an identifier for a data set used to provide content that is displayed in or selected on user interface content presented with a user interface in which the natural language input is entered; and
determining that the data set is relevant to the natural language input based on the received identifier.

9. The method of claim 1, comprising receiving the natural language input through an application programming interface (API).

10. The method of claim 1, comprising:
receiving the natural language input over a network from a user device; and
providing the SQL statement to the user device over a network for display in a user interface of a client device.

11. The method of claim 1, comprising:
providing the SQL statement to a database system;
obtaining results that the database system generates based on executing the SQL statement; and
providing at least a portion of the results or natural language text describing the results in response to the natural language input.

12. The method of claim 1, wherein the criteria specified by the natural language input comprise one or more of a data set from which to retrieve data, a type of data to retrieve, a selection criterion, a filter criterion, or a sorting criterion.

13. The method of claim 1, comprising:
saving the SQL statement at a server system;
creating an object representing the SQL statement or a set of results obtained from executing the SQL statement to obtain data from the data set;
causing a representation of the object to be provided in a user interface, wherein the representation of the object is interactive and configured to provide, upon interaction by a user, access to the SQL statement or a set of results generated by executing the SQL statement.

14. The method of claim 13, comprising forming an association between the object with the data set or a user, a document, or a project that is active when the natural language input is provided;
wherein the representation of the object is selectively caused to be presented based on the context of an application, wherein causing the representation of the object to be provided in the user interface is performed in response to determining that the user interface is associated with the data set or the user, the document, or the project.

15. The method of claim 1, wherein the data model indicates logical objects of the data set, including metrics or attributes that are stored in or can be derived from columns of data in the data set.

16. A system comprising:
one or more computers; and
one or more non-transitory computer-readable media storing instructions that are operable, when executed by the one or more computers, to cause the system to perform operations comprising:
providing, by the one or more computers, an interface configured to receive input comprising data processing criteria expressed in natural language text;
receiving, by the one or more computers, natural language input through the interface, wherein the natural language input specifies one or more criteria for retrieving or generating data from a dataset;
determining that the data set is relevant to the natural language input; and
based on determining that the data set is relevant to the natural language input, selecting a data model for the data set;
obtaining, by the one or more computers, a structured query language (SQL) statement generated by an artificial intelligence or machine learning (AI/ML) model based on the natural language input, wherein obtaining the SQL statement comprises causing the AI/ML model to process the natural language input using the selected data model as context, and wherein the SQL statement expresses the one or more criteria from the natural language input using references to components of the data set or logical objects of the data set; and
providing, by the one or more computers, the SQL statement through the interface.

17. The system of claim 16, wherein the AI/ML model is a large language model.

18. The system of claim 17, wherein the large language model has been trained based on examples of computer-generated SQL statements and corresponding user-edited SQL statements made by editing the computer-generated SQL statements.

19. The system of claim 16, wherein obtaining the SQL statement comprises:
sending a request for the AI/ML model to generate the SQL statement, wherein the request includes:
the natural language input or a natural language instruction the AI/ML model that is generated based on the natural language input; and
data indicating contents or structure of the data set; and receiving the SQL statement that the AI/ML model generated, in which elements of the natural language input are mapped to or translated to components of the data set.

20. One or more non-transitory computer-readable media storing instructions that are operable, when executed by one or more computers, to cause the one or more computers to perform operations comprising:
- providing, by the one or more computers, an interface configured to receive input comprising data processing criteria expressed in natural language text;
- receiving, by the one or more computers, natural language input through the interface, wherein the natural language input specifies one or more criteria for retrieving or generating data from a data set;
- determining that the data set is relevant to the natural language input; and
- based on determining that the data set is relevant to the natural language input, selecting a data model for the data set;
- obtaining, by the one or more computers, a structured query language (SQL) statement generated by an artificial intelligence or machine learning (AI/ML) model based on the natural language input, wherein obtaining the SQL statement comprises causing the AI/ML model to process the natural language input using the selected data model as context, and wherein the SQL statement expresses the one or more criteria from the natural language input using references to components of the data set or logical objects of the data set; and
- providing, by the one or more computers, the SQL statement through the interface.

\* \* \* \* \*